(12) United States Patent
Katagiri

(10) Patent No.: US 6,839,086 B1
(45) Date of Patent: Jan. 4, 2005

(54) CAMERA INCLUDING MULTIPLE LENSES, A RANGING MEANS, AND MULTIPLE IMAGE PROCESSORS

(75) Inventor: Yoshito Katagiri, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/328,669

(22) Filed: Jun. 9, 1999

(30) Foreign Application Priority Data

Jun. 11, 1998 (JP) .......................................... 10/163422
Aug. 21, 1998 (JP) .......................................... 10/235692

(51) Int. Cl.$^7$ ........................ G03B 13/00; H04N 5/232; G02B 15/14
(52) U.S. Cl. .................... 348/347; 348/240.3; 348/348; 348/357; 359/676
(58) Field of Search ................................ 348/347, 348, 348/240.99, 240.1, 240.2, 240.3, 335, 345, 357; 396/72, 79, 80, 81, 82, 83, 88, 374, 429; 359/676, 698, 700

(56) References Cited

U.S. PATENT DOCUMENTS

| | | | | |
|---|---|---|---|---|
| 5,140,360 A | * | 8/1992 | Tsukamoto et al. | ............ 396/76 |
| 5,369,461 A | * | 11/1994 | Hirasawa et al. | ........... 396/135 |
| 5,587,842 A | * | 12/1996 | Iijima et al. | ................. 359/698 |
| 5,612,737 A | * | 3/1997 | Nagano | .................... 348/240.3 |
| 5,752,098 A | * | 5/1998 | Toji et al. | ....................... 396/85 |
| 5,812,189 A | * | 9/1998 | Kimura et al. | ......... 348/240.99 |
| 6,204,880 B1 | * | 3/2001 | Nishimura | ............. 348/240.99 |
| 6,271,974 B2 | * | 8/2001 | Wachi | ......................... 359/697 |
| 6,301,439 B1 | * | 10/2001 | Kasuya | ......................... 396/77 |
| 6,396,645 B1 | * | 5/2002 | Nakayama et al. | .......... 359/701 |

FOREIGN PATENT DOCUMENTS

| | | | | |
|---|---|---|---|---|
| JP | 06313831 A | * | 11/1994 | ............ G02B/7/04 |
| JP | 08094907 A | * | 4/1996 | ............ G02B/7/08 |
| JP | 09-218336 | | 8/1997 | |
| JP | 09218339 A | * | 8/1997 | ............ G02B/7/10 |

* cited by examiner

Primary Examiner—Wendy R. Garber
Assistant Examiner—Justin Misleh
(74) Attorney, Agent, or Firm—Finnegan, Henderson, Farabow, Garrett & Dunner, L.L.P.

(57) ABSTRACT

The present invention relates to an image capturing apparatus incorporating a zoom lens system which performs variable power operations and focus adjustment by means of a driving action of a driving member. There is described an image capturing apparatus which employs the step zooming method with many steps in a unique configuration and which has advantages such as high image quality, small-size, light weight, low power consumption and low price. The image capturing apparatus includes a first lens, a second lens, a photo-electric converting element to receive a light coming from a subject image through the first lens and the second lens and to convert the light into image signals, a driving member to move the first lens and the second lens in an optical path, and a guiding member for guiding the second lens moved by the driving member so that a distance between the photo-electric converting element and the second lens changes stepwise.

47 Claims, 14 Drawing Sheets

PRIOR ART

PRIOR ART

CAMERA INCLUDING MULTIPLE LENSES, A RANGING MEANS, AND MULTIPLE IMAGE PROCESSORS

BACKGROUND OF THE INVENTION

The present invention relates to an image capturing apparatus incorporating a zoom lens system which performs variable power operations and focus adjustment by means of a driving action of a driving member.

Recently, the development of digital cameras has progressed remarkably. Improvements for achieving high pixel density up to mega-pixels, miniaturization equivalent to a silver-halide camera, cost reduction, etc. have progressed day by day. In addition, the number of digital cameras which incorporate an optical zooming system have been increased.

In the abovementioned trends, it has been considered to realize a low cost digital camera with a simple structure by means of a simplified zooming operation. A technique for this goal is set forth in Japanese Patent Tokkaihei 9-218336. The disclosed technique is intended to simplify the structure of the image capturing apparatus by employing a configuration in which a plurality of focal lengths are selected in a stepping mode, by changing focal lengths step by step, or by changing focal lengths in two or three stages by means of a conversion lens. Further, the disclosed configuration makes it possible to select a larger number of focal lengths by means of the electronic enlarging processing which enables the selection of an intermediate focal length.

Incidentally, although it is possible to select focal lengths in a stepping mode, the abovementioned technique does not include a focusing mechanism. Accordingly, the focus point is adjusted at the longest focal length at which the subject image is focused on CCD (Charge Coupled Device), and in the shorter focal length, the subject image can be focused on CCD as it is, since the depth of focus becomes deeper.

Employing a zoom lens having no focusing mechanism, however, the depth of focus becomes shallow when the zoom lens is set at the longer focal length, and the image quality of the subject in near distance is deteriorated when pan-focusing, in which subjects included up to infinity are captured within its depth of focus, is performed. Accordingly, in order to obtain high quality images, a focusing mechanism is required in addition to the zooming mechanism. A focusing mechanism, however, requires a separate driving mechanism including a motor and a control circuit, resulting in an increase of parts and production of a large-sized, high price image capturing apparatus.

Further, a large-sized apparatus results in an increases in weight and the driving mechanism of the lens rapidly drains batteries. As a result, in a worst case, an image capturing can not be reliably conducted by the user, due to the rapid dissipation of the battery.

On the other hand, recently, a step zooming method has been introduced in the field of the silver-halide camera which incorporates a zoom lens barrel, aiming at a miniaturization and cost reduction of the camera. As an example of the step zooming method, a technique set forth in (1) Japanese Patent Tokkaihei 08-94907 will be described in the following.

According to the step zooming method, a zooming region between the longest focal length and the shortest focal length is divided into a predetermined number of steps, namely, a stepping number of focal lengths. The step zooming method is described as follow, referring the zooming block diagram shown in FIG. 9. In FIG. 9, the horizontal axis indicates a variation of the focal length which is the shortest state at a position W, and successively becomes longer along $M_1$, $M_2$ and finally is the longest state at a position T. Accordingly, in this zoom lens, it is possible to change the focal length in four steps. The vertical axis indicates the moving amount of the front lens group and that of the rear lens group in the direction of the optical path, both of which are included in the zoom lens. Since the front lens group is helicoidally engaged with a rotating cam barrel driven by a motor, it moves in a straight direction, associating with the rotation of the lens frame. On the other hand, the rear lens group is driven by a cam formed on the cam barrel so that the rear lens group repeatedly moves between a focal position at which the shooting distance is ∞ (infinity) and a focal position at which the shooting distance is N (near distance) on the saw-tooth shaped locus.

For example, when the focal length is set at position W and a focusing operation is performed, only the front lens group moves between W and 1, corresponding to the shooting distance, while the rear lens group does not move. When single step zooming is performed in the telephoto-direction, both the front lens group and the rear lens group move to the position M1 after passing through the position 1. In the same way, when two-step zooming is performed in the telephoto-direction, both of them move to the position M1 after passing through the positions 1, M1 and 2. As mentioned above, since the focusing operation and the zooming operation are repeatedly performed by moving the front lens group and the rear lens group in the zoom lens, it becomes possible that a zooming mechanism and a focusing mechanism are integrated into the same mechanism. Accordingly, the structure of the camera is simplified by reducing the number of parts, and a small-sized zoom lens barrel can be attained.

Another example of a zoom lens barrel employing the step zoom method is set forth in (2) Japanese Patent Tokkaihei 6-313831, disclosing a configuration of the zoom lens barrel in which the switching operation of the focal length and the operation of focus adjustment are achieved by means of the same driving means including a motor, a cam, etc. and are selected in a stepping mode.

Although, in a conventional zoom lens barrel, a switching operation of the focal length, namely a zooming operation, and an operation of focus adjustment, namely a focusing operation, are performed by means of separate mechanisms, respectively, the disclosed configuration of the zoom lens barrel makes it possible to perform a zooming operation and a focusing operation with the same mechanism. Therefore, a very small-sized zoom lens barrel is attained.

The abovementioned zoom lens barrel employs a so-called step zoom method in which the length of the extended stroke between the position of the longest focal length and the position of the shortest focal length is divided into a predetermined number of variable power regions, in other words, divided into stepped number of focal lengths. This step zoom method will be described, referring FIG. 1. In FIG. 1, the vertical axis indicates the moving amount of the front lens group and that of the rear lens group in the direction of the optical path, both of which are included in the shooting lens, and further the horizontal axis indicates variations of the focal length. The focal length is the shortest state at a position W, and successively becomes longer along $M_1$, $M_2$–$M_6$, and finally is the longest state at a position T. Accordingly, it is possible to change the focal length in eight steps.

The zoom lens barrel can be further shrunk from the position W to a storing position, so that the zoom lens barrel is housed in the storing region of the camera main body to miniaturize the size of the camera. Incidentally, since the miniaturization of the camera overrides other factors in the storing region, ranges from all subjects are apt to be optically out of focus. Therefore, the storing region is regarded as an impractical region for capturing images.

In addition, the zoom lens barrel can be further extended from the position T (∞) to an extended region, which can be utilized to prevent a moving restriction of the shooting lens due to a change of the stop position, which is caused by the focus adjustment of the lens at a reference length (position ∞, in this example) in the long focal length, and by variations of the stop position caused by the motor inertia when driving the shooting lens, and by variations of the mechanism rising from design conditions.

The front lens group moves linearly by means of a helicoidal engagement with a rotating cam barrel linked to the motor, while the rear lens group is driven by a cam formed on the cam barrel. Thus, the focal length can be varied repeatedly between a focus adjustment position at an infinity (∞) and that at a near range (N).

For example, when the focal length is set at position W, the shooting lens is focused at infinity (∞). When performing focus adjustment, the front lens group and the rear lens group move between W and $M_1$, corresponding to the image shooting range. Accordingly, the focal length varies in accordance with the focus adjustment, and reaches the focal length of $M_1$ at the near range (N). Performing single step zooming operation toward telephoto-direction, the front lens group and the rear lens group move to the position $M_1$, and the shooting lens is focused at the near range (N). When the focus adjustment is conducted at this position, the front lens group and the rear lens group move between $M_1$ and $M_2$, corresponding to the image shooting range. Accordingly, the focal length varies in accordance with the focus adjustment, and reaches the focal length of $M_2$ at the infinity (∞).

When the image capturing is finished after the focus adjustment, the zoom lens returns to one of the initial positions, W–T. In other words, the zoom lens returns to the position of the shortest focal length in each variable power region.

Since the focusing operation and the zooming operation are performed successively and repeatedly in the abovementioned configuration of the zoom lens barrel, the front lens group and the rear lens group can be driven by a single mechanism, being utilized for both focusing and zooming operations. This configuration decreases the number of necessary parts, resulting in a simpler camera structure, and attains a small-sized zoom lens barrel at low cost.

It is difficult, however, to realize a step zoom lens barrel having many steps as well as aiming at a small-sized zoom lens barrel as mentioned above, since the diameter and the rotatable angle of the cam barrel for moving the rear lens group are limited. Therefore, the number of selectable focal lengths for the user is also quite limited.

SUMMARY OF THE INVENTION

The present invention is attained in view of the foregoing problems, and the object of the present invention is to provide an image capturing apparatus which employs the step zooming method with many steps in a unique configuration being impossible to realize in the silver-halide camera, and which has advantages such as high image quality, small-size, light weight, low power consumption and low price.

To overcome the cited shortcomings, the abovementioned object of the present invention can be attained by an image capturing apparatus, comprising:

a first lens;

a second lens;

a photo-electric converting element to receive a light incoming from a subject image through the first lens and the second lens, and to convert the light into image signals;

a driving member to move the first lens and the second lens in an optical path; and guiding means for guiding the second lens moved by the driving member so that a distance between the photo-electric converting element and the second lens changes stepwise.

Further, the abovementioned object can be attained by the following structures as preferable embodiments of the present invention.

(1) An image capturing apparatus being characterized in that the image capturing apparatus is provided with:

a zoom lens in which a variable power operation in a plurality of predetermined variable power regions and a focus adjustment in each of the variable power regions are performed by means of a driving action of one component driving member;

ranging means for measuring a distance between the image capturing apparatus and a subject;

calculator to calculate an image magnification factor, which varies between before and after the focus adjustment, from a ranging signal of the ranging means and a variable power information designating a selected variable power region of the zoom lens;

a photo-electric converting element to receive a subject image by means of the zoom lens, and to convert the subject image into image signals;

a first image processor for outputting a first image data generated by processing the image signals before the focus adjustment; and a second image processor for outputting a second image data generated by applying a magnification change processing to the first image data based on a calculation result of the calculator.

(2) An image capturing apparatus being characterized in that the image capturing apparatus is provided with:

a zoom lens in which a variable power operation in a plurality of predetermined variable power regions and a focus adjustment in each of the variable power regions are performed by means of a driving action of one component driving member;

ranging means for measuring a distance between the image capturing apparatus and a subject;

a calculator to calculate an image magnification factor, which varies between before and after the focus adjustment, from a ranging signal of the ranging means and a variable power information designating a selected variable power region of the zoom lens;

a photo-electric converting element to receive a subject image by means of the zoom lens, and to convert the subject image into image signals;

a first image processor for outputting a first image data generated by processing the image signals before the focus adjustment; and a second image processor for outputting a second image data generated by applying a grouping processing to a peripheral region of the first image data based on a calculation result of the calculator.

(3) The image capturing apparatus of item 1 or 2 mentioned above, being characterized in that, when the zoom lens is moved to the predetermined variable power region, the zoom lens is stopped at a position at which an image frame becomes maximum within the predetermined variable power region.

(4) The image capturing apparatus of item 1, 2 or 3 mentioned above, being characterized in that the zoom lens comprises a storing region being capable of moving in a direction toward the photo-electric converting element further inner than a position of the shortest focal length, and image capturing is not performed in the storing region.

(5) The image capturing apparatus of item 2 mentioned above, being characterized in that the grouping processing performed by the second image processor is to superpose a predetermined window frame on a peripheral region of an image based on the first image data.

(6) The image capturing apparatus of item 2 mentioned above, being characterized in that the grouping processing performed by the second image processor is to superpose a predetermined color region and/or pattern region on a peripheral region of an image based on the first image data.

(7) The image capturing apparatus of item 1, 2, 3 or 4 mentioned above, being characterized in that the image capturing apparatus comprises a display section for appropriately displaying images based on the first image data, the second image data and a third image data which is outputted by the first image processor after focus adjustment.

(8) The image capturing apparatus of item 7 mentioned above, being characterized in that the image capturing apparatus comprises an image data memory means for memorizing at least the third image data.

(9) The image capturing apparatus of item 1, 2, 3, 4, 5, 6, 7, or 8 mentioned above, being characterized in that the image capturing apparatus comprises an exposure section to expose a silver-halide film, wherein the light incoming from a subject image through the zoom lens is divided into a first light and a second light, the first light is introduced to the photo-electric converting element while the second light is introduced to the exposure section.

(10) An image capturing apparatus being characterized in that the image capturing apparatus is provided with:

a zoom lens in which both a zooming operation and a focusing operation are performed by means of a driving action of one component driving member, and which is driven to either a first region in which a image processing is not performed, or a second region in which a image processing is performed;

a discriminator for discriminating whether the zoom lens is moved to the first region or is moved to the second region;

a photo-electric converting element to receive a subject image incoming through the zoom lens, and to convert the subject image into image signals; and an image processing section to output a first image data based on the image signals when the discriminator determines that the zoom lens is moved to the first region, or to output a second image data generated by applying a magnification change processing to the image signals based on predetermined zooming magnification factors when the discriminator determines that the zoom lens is moved to the second region.

(11) An image capturing apparatus being characterized in that the image capturing apparatus is provided with:

a zoom lens in which both a zooming operation and a focusing operation are performed by means of a driving action of one component driving member, and which is driven to either a first region in which a image processing is not performed during the focusing operation, or a second region in which a image processing is performed during the focusing operation;

a discriminator for discriminating whether the zoom lens is moved to the first region or is moved to the second region;

a photo-electric converting element to receive a subject image incoming through the zoom lens, and to convert the subject image into image signals; and an image processing section to output a first image data based on the image signals when the discriminator determines that the zoom lens is moved to the first region, or to output a second image data generated by applying a magnification change processing to the image signals based on predetermined zooming magnification factors when the discriminator determines that the zoom lens is moved to the second region.

(12) The image capturing apparatus of item 10 or 11 mentioned above, being characterized in that the image capturing apparatus comprises a ranging means for measuring a distance between the image capturing apparatus and the subject to output a ranging signal and an image processing section to output the first image data based on the image signals, which are obtained after performing a focus adjustment on the basis of the ranging signal from a predetermined reference position, when the discriminator determines that the zoom lens is moved to the first region, and to output a second image data generated by applying a magnification change processing to the image signals, which are obtained after performing a focus adjustment on the basis of the ranging signal from a predetermined reference position, based on predetermined zooming magnification factors, when the discriminator determines that the zoom lens is moved to the second region.

Incidentally, the one component driving member, described in the above, is defined as a member which is commonly utilized for driving the zoom lens during both zooming and focusing operations. For example, a common cam barrel is equivalent to the one component driving member.

While, the grouping processing, described in the above, is to appropriately process the peripheral region of the first image, being out of the image frame after the focus adjustment, regarding as an outer region of the captured image.

Further, the above description of "a distance between the photo-electric converting element and the second lens changes stepwise" is valid not only in the zooming diagrams shown in FIG. 9 and FIG. 11, but also in the zooming diagrams shown in FIGS. 12(a)–(d).

Further, the magnification change processing, described herein, is to perform, e.g., an image enlarging or reducing operation including a signal processing and/or an image processing by electrically processing image signals or image data, instead of optically changing a variable power by moving a component in an optical system.

BRIEF DESCRIPTION OF THE DRAWINGS

The objects and advantages of the present invention will become apparent upon reading the following detailed description and upon reference to the drawings in which.

DETAILED DESCRIPTION OF THE PREFERRED EMBODIMENT

Figure 1:
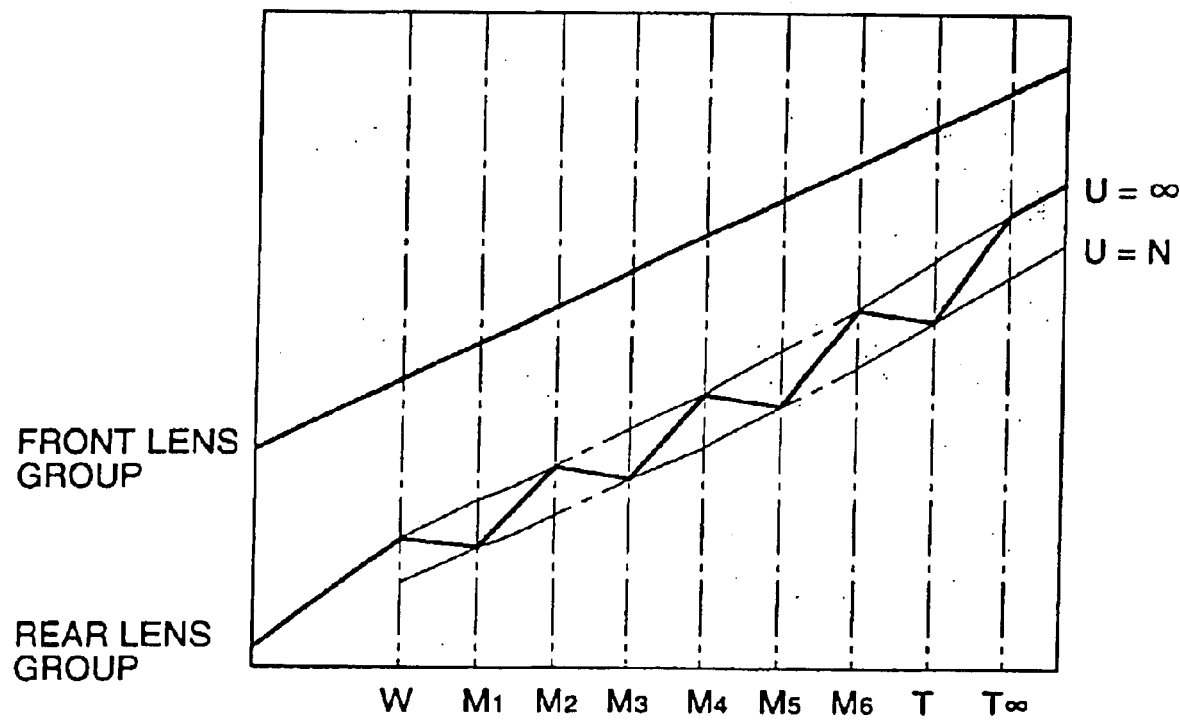
FIG. 1 shows a zooming diagram of the step zooming method.

An example of the image capturing apparatus, embodied in the present invention, will be described in the following, referring to the drawings.

Figure 2:
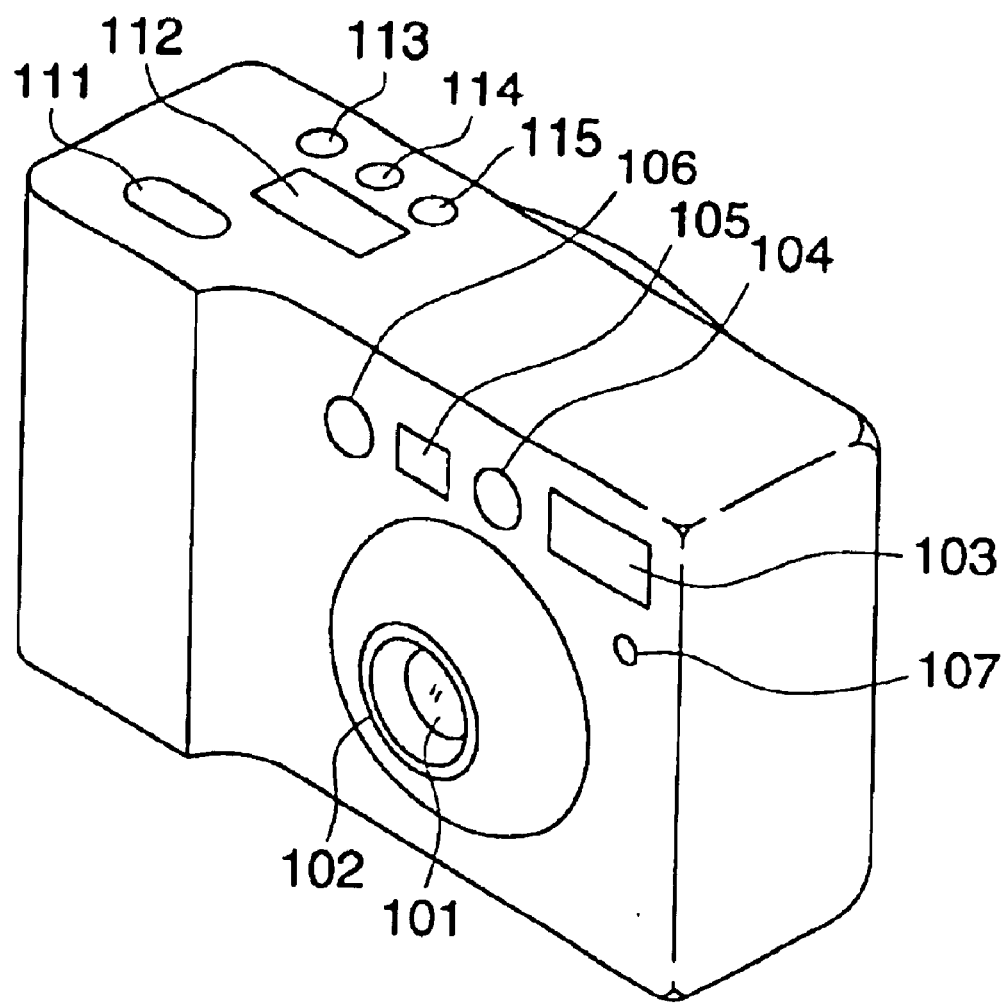
FIG. 2 shows a front perspective view of a digital camera.
Figure 3:
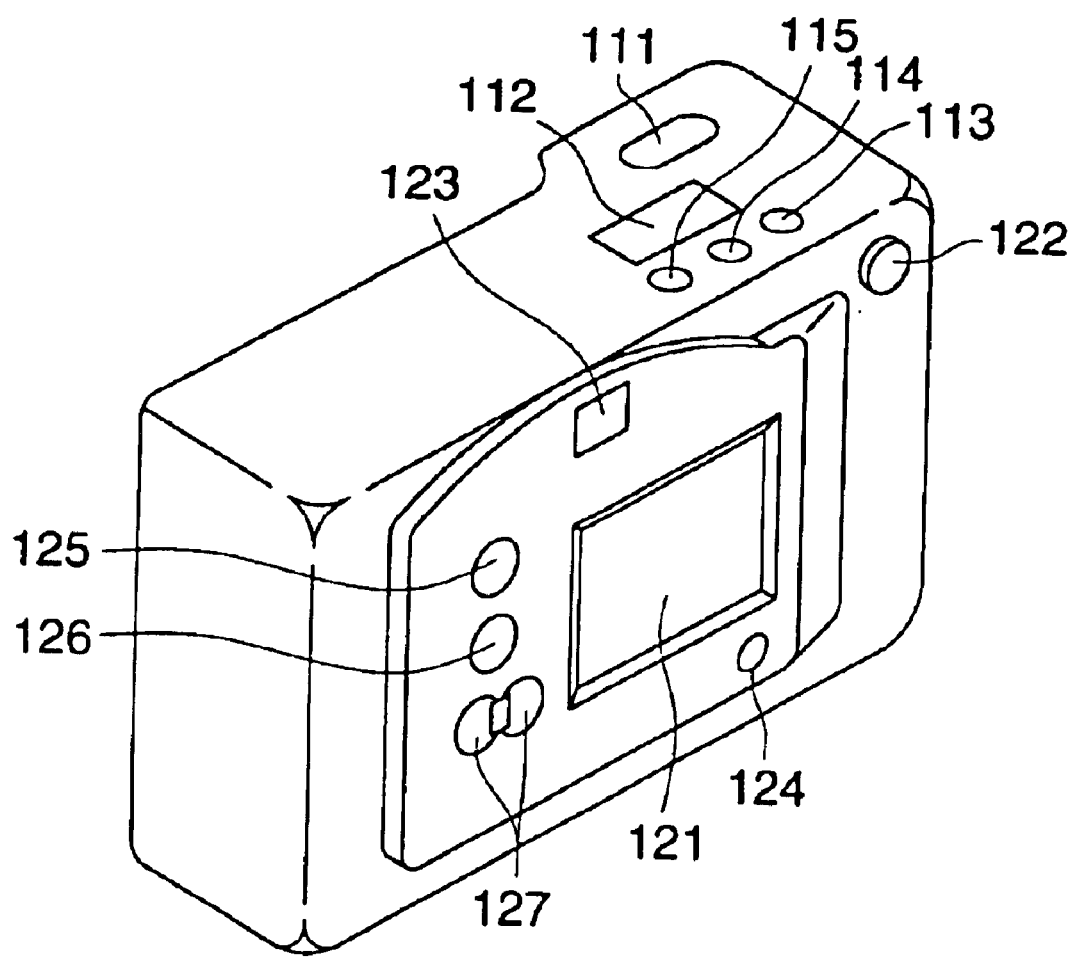
FIG. 3 shows a rear perspective view of a digital camera.

Initially, an example of a digital camera is explained, referring to FIGS. 2 and 3. FIG. 2 shows a front perspective view of the digital camera, while FIG. 3 shows a rear perspective view.

In FIG. 2, a zoom lens barrel 102 which incorporates an image shooting lens 101 serving as a zoom lens, is mounted at a front center of the digital camera. A strobe light section 103, an infrared light emission window 104, a view finder window 105 and an infrared light admitting window 106 are arranged above the image shooting lens 101. Under the strobe light section 103, a strobe sensor 107 is arranged, which serves to adjust the intensity of the strobe lighting.

In FIGS. 2 and 3, a release button 111 is disposed on the upper surface of the digital camera, while a liquid-crystal display panel 112, a flash mode switch 113 a self-timer/near view select switch 114 and an image quality mode switch 115 are disposed behind the release button 111.

As shown in FIG. 3, a liquid-crystal monitor display 121 and a main switch button 122 are disposed at the center, and at the upper right corner on the rear surface of the digital camera, respectively. A finder emission window 123 and a monitor switch button 124 are disposed at the upper side and the lower side of the liquid-crystal monitor display 121, respectively. A menu button 125, a setting button 126 and a zooming button 127 are disposed at the left side of the liquid-crystal monitor display 121.

FIG. 2 shows a status of the zoom lens barrel 102 being withdrawn and stored into an inside region of the digital camera. The zoom lens barrel 102 will be extended to a point of the minimum focal length by depressing the main switch button 122. Then, the subject image is displayed on the liquid-crystal monitor display 121, after the subject light incoming from the image shooting lens 101 is photo-electrically converted to electric signals by means of an internal CCD, and image processing is applied to the electric signals. Further, the zooming action of the image shooting lens 101 is performed within a predetermined number of steps by pushing the zooming button 127. It is also possible to select various kinds of shooting modes, which are displayed on the liquid-crystal display panel 112, by operating the flash mode switch 113 the self-timer/near view select switch 114 or the menu button 125.

In order to prevent undue discharging of the battery, either the enable or disable mode of the liquid-crystal monitor display 121 can be selected by the monitor switch button 124. To optically observe the subject in the disable mode of the liquid-crystal monitor display 121, the view finder window 105 and the finder emission window 123, serving as an optical view finder, are equipped.

By pushing the release button 111 up to half its stroke, an infrared light is emitted from the infrared light emission window 104, and returns to the infrared light admitting window 106 after being reflected from the subject, so as to perform a ranging operation based on the principles of trigonometry. Accordingly, the ranging method employed in the digital camera of the present example is what is called an active method which is also employed for other conventional digital cameras. However, the scope of the applicable method for the ranging operation is not limited to the active method. Any method capable of generating a ranging signal, such as what is called the passive method, in which a certain ranging element receives light from the subject, is also applicable.

Figure 4:
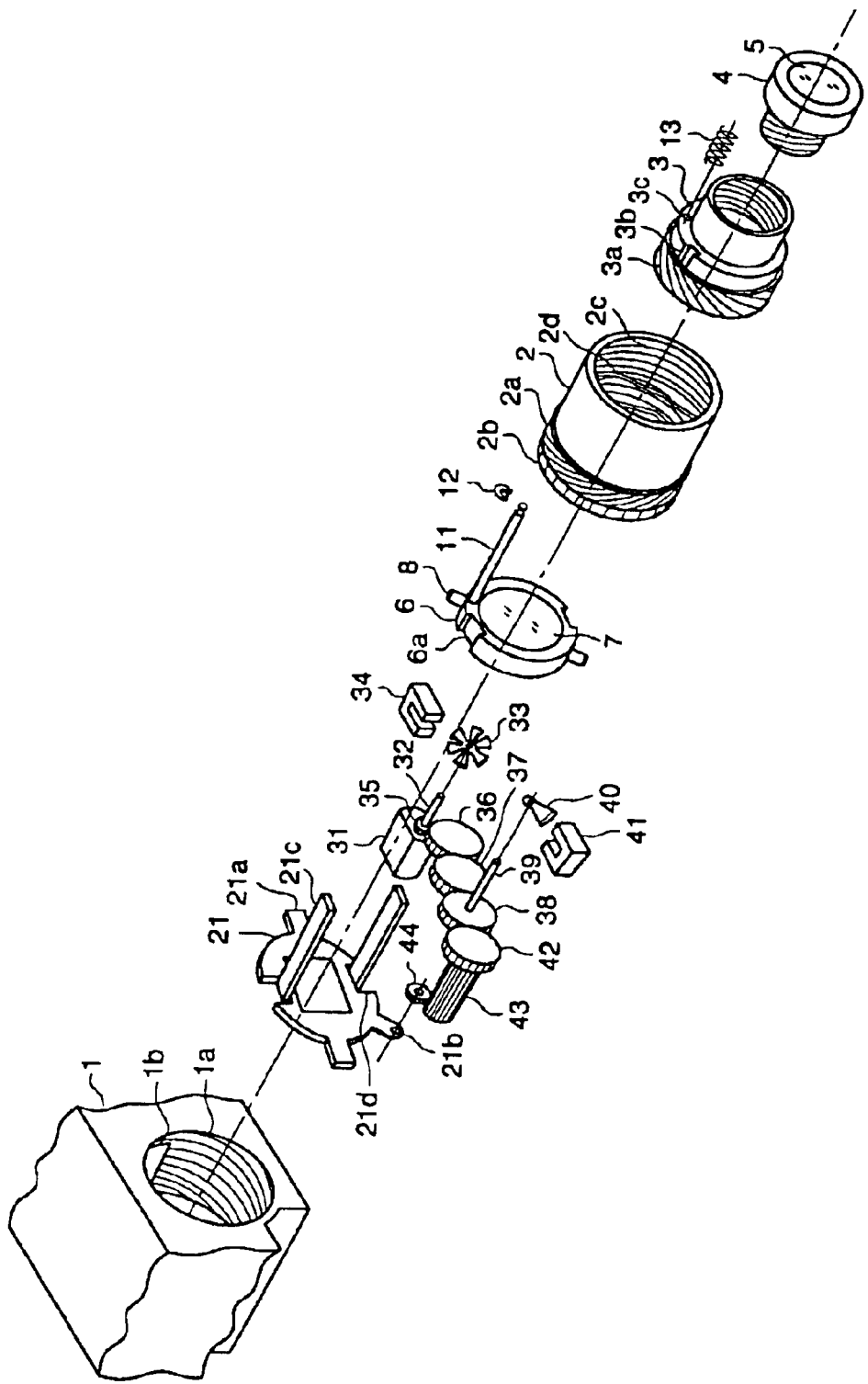
FIG. 4 shows an exploded perspective view of a zoom lens barrel.
Figure 5:
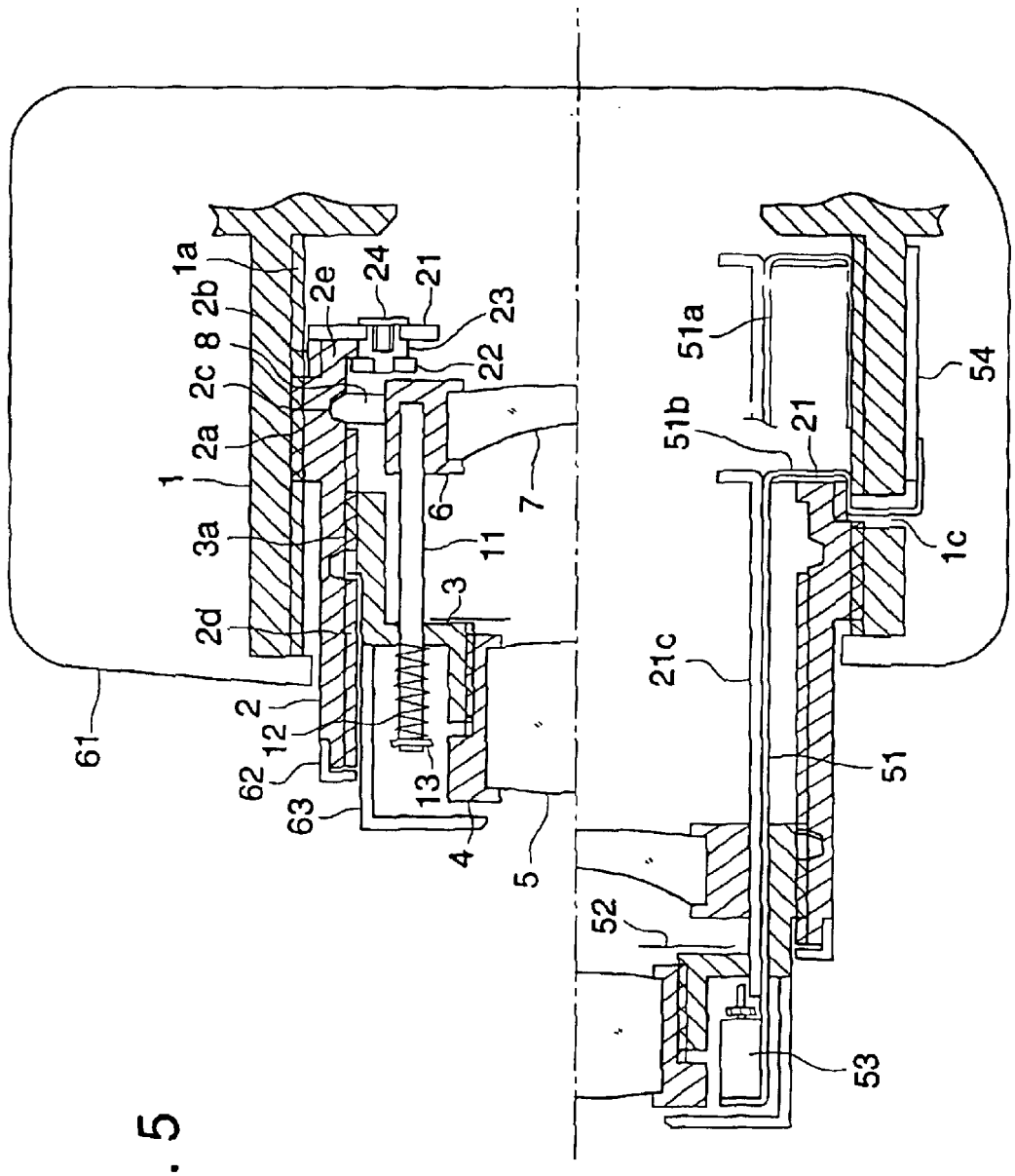
FIG. 5 shows a vertical cross-sectional view of a zoom lens barrel.

Next, the zoom lens barrel, which moves the zooming lens, will be described in the following, referring to FIGS. 4 and 5. FIG. 4 shows a exploded perspective view of the zoom lens barrel, and FIG. 5 shows a lateral cross-sectional view of the same zoom lens barrel, shown in the view in the upper half of the drawing when the focal length is set at a shorter focal length, and in the view in the lower half of the drawing when the focal length is set at a longer focal length.

A stationary barrel 1 is integrally fixed to the camera main body. A female helicoid 1a is formed on the inner surface of the stationary barrel 1, and guide slots 1b for guiding a straight moving guide 21 (described later) are formed at both the left and right sides of the inner surface, crossing the female helicoid 1a. A cam barrel 2 comprises a male helicoid 2a, which is formed on the outer circumference of it and is engaged with the female helicoid 1a, a large gear 2b formed integrally with the male helicoid 2a, a female helicoid 2c formed on the inner surface of it, a cam groove 2d serving as an inner cam and a rib 2e located in an inner direction of its end section. In order to contribute to the miniaturization of the lens barrel, the tip locus of the large gear 2b is formed to be smaller than the root diameter of the male helicoid 2a.

A front group lens frame 4, which holds a front lens group 5 having a positive total focal length, is attached to a front group moving frame 3 by screwing it from the front side. Any correction of the dimensional error of the lens parts during manufacture can be achieved by adjusting the screwed-in depth of the front group lens frame 4. The outer surface of the front group moving frame 3 comprises a male helicoid 3a engaged to the female helicoid 2c, a guide slot 3b for guiding 11 (described later) and a hole 3c for a guide shaft 11 (described later). A rear group moving frame 6 holds a rear lens group 7 having a negative total focal length. In addition, the outer surface of the rear group moving frame 6 comprises a guide slot 6a for guiding the straight moving guide 21 (described later), a rear group cam pin 8 engaged to the cam groove 2d and the guide shaft 11 protruded to the front direction. A shaft spring 13 is inserted onto the guide shaft 11 and is stopped by an E ring stopper 12 to prevent sipping out of the shaft spring.

The straight moving guide 21 is engaged to the stationary barrel 1 so that both left and right protrusions 21a can slide along the guide slot 1b, and arm sections 21c, which are bent toward the front, can also slide along the guide slot 3b and the guide slot 6a. While, a rotatable driving gear 44 (described later) is attached to another protrusion 21b of the straight moving guide 21. A guide fixing plate 22 couples the straight moving guide 21 to the cam barrel 2, and a guide fixing shaft 23 couples the straight moving guide 21 to the guide fixing plate 22 to hold the cam barrel 2 by means of the rib 2e, and a fixing screw 24 fastens the straight moving guide 21 to the guide fixing shaft 23.

A propeller-shaped encoder 33 is attached to a driving shaft 32 of a motor 31 to generate continues pulse signals, by which current positions of the front lens group 5 and the rear lens group 7 are detected, by means of a photo-interrupter 34. A pinion gear 35 is directly coupled to the driving shaft 32 of the motor 31, and the rotation of the motor 31 is transmitted to a driving gear 44 through a series of gears including a first gear 36, a second gear 37, a third gear 38, a fourth gear 42 and a fifth gear 43 having a long length in a direction of the optical axis. Further, the driving gear 44 engages with the large gear 2b of the cam barrel 2. An encoder 40 is attached to a shaft 39 of the third gear 38 to generate intermittent pulse signals, by which the current zooming position is detected, by means of a photo-interrupter 41.

An aperture diaphragm 52 is mounted in the front group moving frame 3 and is driven by a driving motor 53. FPC 51 is utilized for electrically connecting the driving motor 53 to a print circuit board 54, in such a manner that FPC 51, extended from the terminal of the driving motor 53 toward the rear of the camera, is disposed in a gap between the arms 21c of the straight moving guide 21 and the inner surface of the cam barrel 2, and is folded back at the rear end of the cam barrel 2 toward the front of the camera, and further the folded portion of FPC 51 is disposed in a gap between the outer surface of the cam barrel 2 and the stationary barrel 1. FPC 51 further extends to the outer circumference of the stationary barrel 1 through a hole 1c located in front of the rear end of the cam barrel 2 which is in the most extended state from the stationary barrel 1, and then FPC 51 terminates at the print circuit board 54 mounted on the camera main frame. Incidentally, 51a shows the state of FPC 51 when the lens barrel is maximally withdrawn and housed inside the camera main frame. An outline 61 shows the outer shape appearance of the camera, while a makeup ring 62 and a front sleeve 63 are attached to the cam barrel 2 and the front group lens frame 3, respectively.

Next, the basic operation of the zoom lens barrel will be described in the following.

THE FIRST EXAMPLE

In the first example, zooming and focusing operations of the zoom lens barrel, in which variable power regions for zooming operation and focal regions for focusing operation are staggered continuously along its stroke, are achieved by driving the front lens group 5 and the rear lens group 7 by means of a single set of driving members including the motor 31 through the cam barrel 2, shown in FIG. 4. When either zooming or focusing is operated, the rotational driving force of the motor 31 started by a command signal (not shown) is transmitted to the fifth gear 43 through a gear train including gears 35, 36, 37, 38 and 42. Then, the fifth gear 43 transmits the rotational driving force to the driving gear 44 attached to the straight moving guide 21. The driving gear 44 is engaged with the large gear 2b to move the cam barrel 2, which is helicoidally engaged with the stationary barrel 1, in a direction of the optical axis by rotating the cam barrel 2. At this time, the cam barrel 2 is propelled either forward or backward in response to the rotating direction of the motor 31. Although the straight moving guide 21. is integrally attached to the rib 2e of the cam barrel 2 by means of the guide fixing plate 22, the guide fixing shaft 23 and the fixing screw 24, the straight moving guide 21 is only movable in the direction of the optical axis, since the rotation of the straight moving guide 21 is prevented by means of both the left and right protrusions 21a linked to the guide slot 1b of the stationary barrel 1. In the same manner, the rotation of the front group moving frame 3 is also prevented by means of the arms 21c of the straight moving guide 21. In addition, the rotation of the rear group moving frame 6 is also prevented in association with the front group moving frame 3, since the guide shaft 11 protruding from the rear group moving frame 6 penetrates through the front group moving frame 3. Accordingly, when the cam barrel 2 moves with its rotation, the front group moving frame 3, which is helicoidally engaged with the cam barrel 2, moves either forward or backward only in the direction of the optical axis. While, the rear group moving frame 6, which is cam-engaged with the cam groove 2d of the cam barrel 2, is guided by a locus of the cam groove 2d.

Incidentally, since the cam groove 2d of the cam barrel 2 is formed in such a manner that its inclination angles smaller or larger than the lead angle of the female helicoid 2c are repeatedly staggered, the rear group moving frame 6 moves in a non-linear mode like saw-tooth shape, though the front group moving frame 3 moves in a linear mode by means of the helicoid driving. As is also the same in the aforementioned zooming diagram referred in FIG. 1, since the variable power regions for zooming operation and focal regions for focusing operation are staggered continuously along its optical axis, the focusing drive and the zooming drive can be achieved by the same mechanism.

Although the engaging position of the fifth gear 43 with the driving gear 44 varies in accordance with the movement of the cam barrel 2, the long tooth of the fifth gear 43 extended along the optical axis make it possible to maintain engagement with the driving gear 44 irrespective of the movement of the cam barrel 2. Further, the rib 2e of the cam barrel 2 also acts as a bearing surface to support the rotation of the cam barrel 2 in addition to a thrust stopper of the straight moving guide 21 to prevent deformation of the cam barrel 2 at the time of transmitting the driving force.

In the present example, the zoom lens comprised of two lens groups has been described in the above. The present invention is also applicable for a zoom lens comprised of more than two lens groups.

Figure 10:
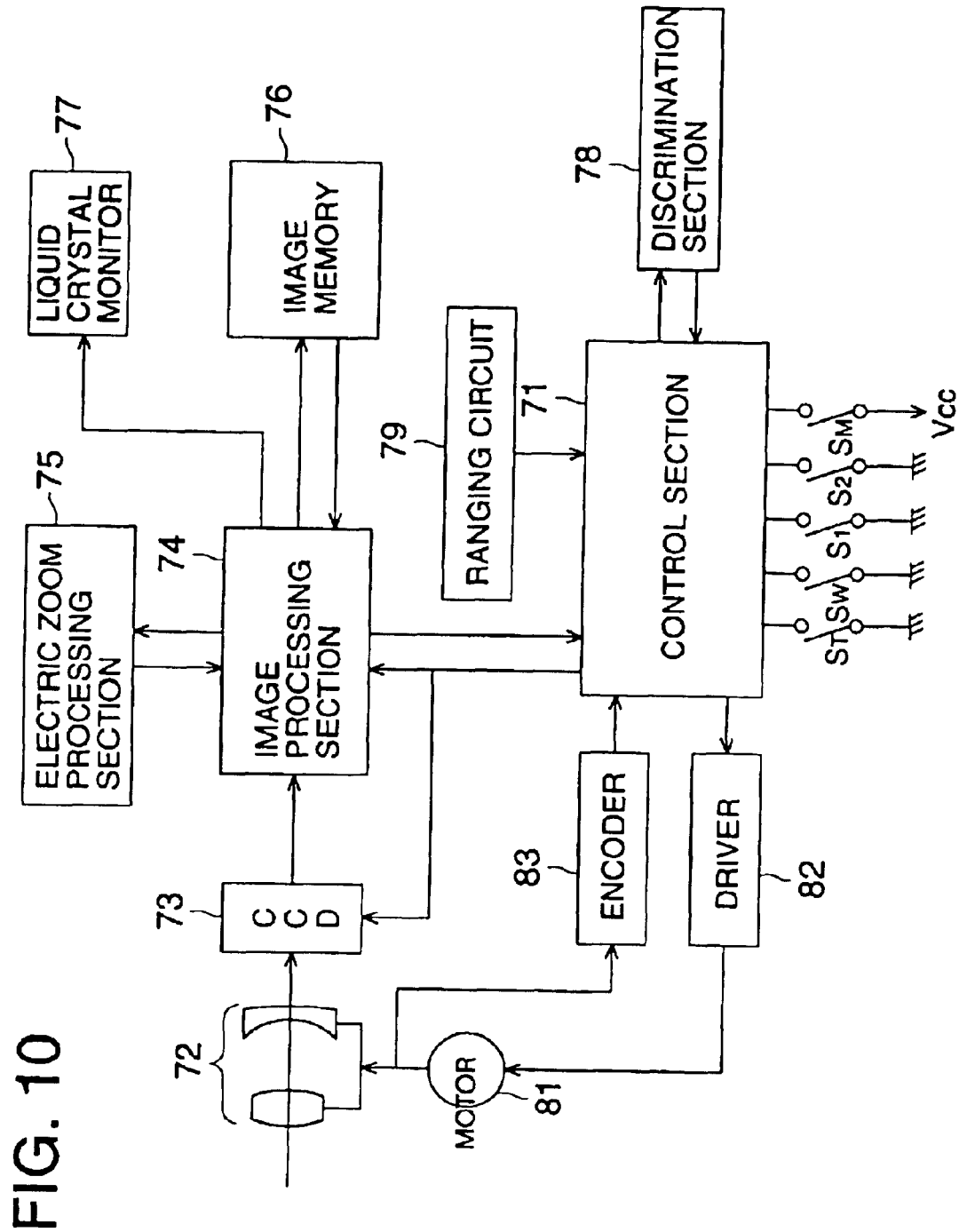
FIG. 10 shows a block diagram of another image processing circuit.
Figure 11:
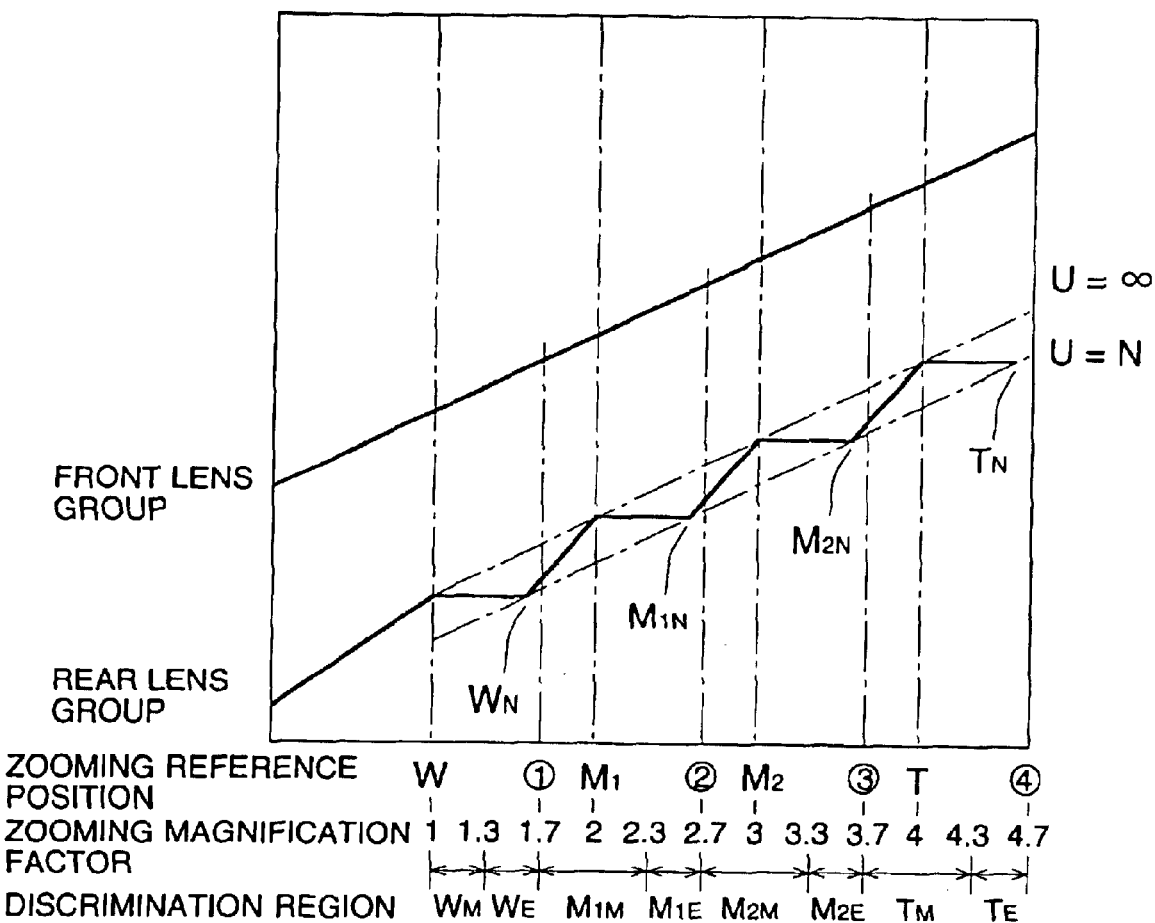
FIG. 11 shows a zooming diagram of the exemplified camera embodied in the present invention.

Next, in regard to a zooming method in which image processing is applied to an image of a captured subject, the first example of the present invention will be described in the following, referring to FIGS. 10 and 11. FIG. 10 shows a block-diagram of an image processing circuit, and FIG. 11 shows a zooming diagram of the first example.

When a main switch $S_M$, shown in FIG. 10, is turned to the ON status by pushing the main switch button 122, shown in FIG. 3, electrical power is fed to a control section 71, and the digital camera enters its active status. At this time, since the zoom lens is located at a storing position and is in an unfocused status on any subject, CCD 73 does not perform a photo-electric conversion, even if the subject image is incoming to CCD 73. Therefore, dissipation of the battery is prevented by cutting the power supply to an image processing section 74 (described later).

When the digital camera enters the active status, a motor 81 starts its rotation, driven by a driving section 82 and the zoom lens 72 is extended from the main body of the digital camera. Then, the zoom lens 72 is stopped at a position W, shown in FIG. 11, by means of an encoder 83. At the same time, electrical power is initially fed to all of the circuits to activate them as well as the control section 71.

Incidentally, the motor 81 and the encoder 83 correspond to the motor 31 and the photo-interrupters 34, 41 in FIG. 4, respectively.

The subject image is projected and focused on CCD 73 by means of the zoom lens 72, and converted to image signals by the photo-electric converting action. The photo-electrically converted image signals are further converted to digital signals in the image processing section 74 to be outputted as first image data. The first image data is stored in a RAM and/or an image memory 76 serving as a RAM card, and/or is further converted to analog signals to be sent and displayed onto a liquid-crystal monitor display 77 which corresponds to the liquid-crystal monitor display 121 in FIG. 3.

Further, the liquid-crystal monitor display 77, embodied in the present invention, sequentially displays images of the subject, which are switched at an interval of every 30 msec–300 msec. The sequential timing of image display on the liquid-crystal monitor display 77 is not limited to the abovementioned switching interval. It is desirable to employ such a switching interval so that the user does not feel any sense of incongruity for switching of the displayed images.

Incidentally, regarding the liquid-crystal monitor display 121, it makes no essential difference to employ a plasma-display, etc., instead of the liquid-crystal.

When only the main switch $S_M$ is turned to the ON status, the zoom lens 72 does not perform focusing, since a ranging measurement circuit 79 has not activated. Therefore, the focal point of the zoom lens 72 is set at infinity ($\infty$) as its initial position, when the position of the zoom lens 72 is located at the position W shown in FIG. 11.

Next, the zooming diagram shown in FIG. 11 will be detailed in the following.

Figure 9:
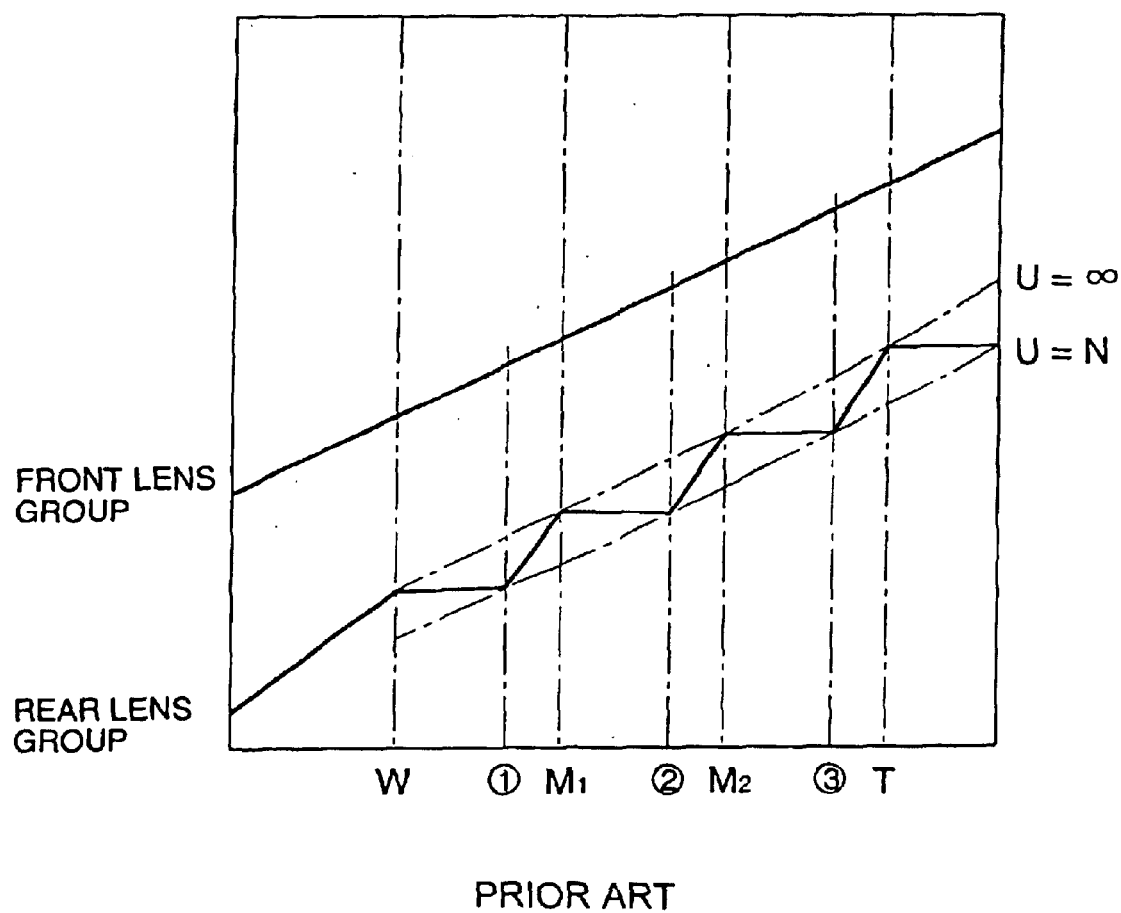
FIG. 9 shows a zooming diagram of the conventional step zooming method.

On the horizontal axis of this zooming diagram, being similar to that shown in FIG. 9, various focal length positions are plotted, including the position W at which the focal length is minimum, the positions $M_1$ and $M_2$ at which the focal lengths are progressively longer and the position T at which the focal length is maximum. The vertical axis designates the extension amount of the front lens group and that of the rear lens group. Four reference positions W, $M_1$, $M_2$ and T for focusing operation after zooming operation are plotted along the horizontal axis. In the present example, the focal length at each of the reference positions is determined so that the focal length at the position W, being reference focal length, varies to twice of it at the position $M_1$, to three times of it at the position $M_2$ and to four times of it at the position T. The regions for focusing operation are also determined, including regions between such as W–$W_N$, $M_1$–$M_{1N}$, $M_2$–$M_{2N}$ and T–$T_N$.

Incidentally, in the zooming diagram shown in FIG. 11, the regions for focusing operation are established so that they are substantially perpendicular to the optical axis. Although, in the structure of the above case, the rear lens group does not move in the direction of the optical axis in relative to the cam barrel, the scope of the present invention is not limited to the above case. The following methods are also included in the scope of the present invention.

Figure 12:
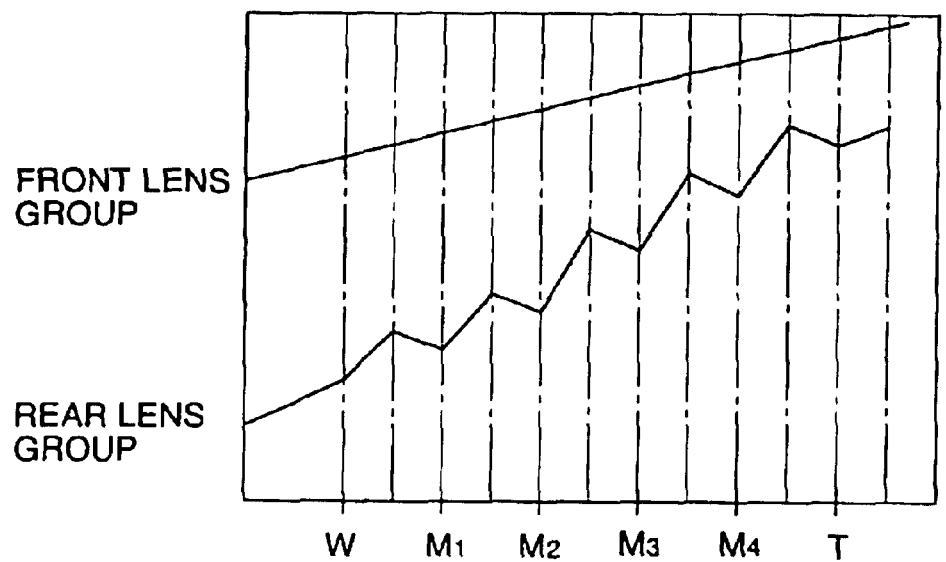
FIGS. 12(a), (b), (c) and (d) show examples of zooming diagrams embodied in the present invention.
Figure 12:
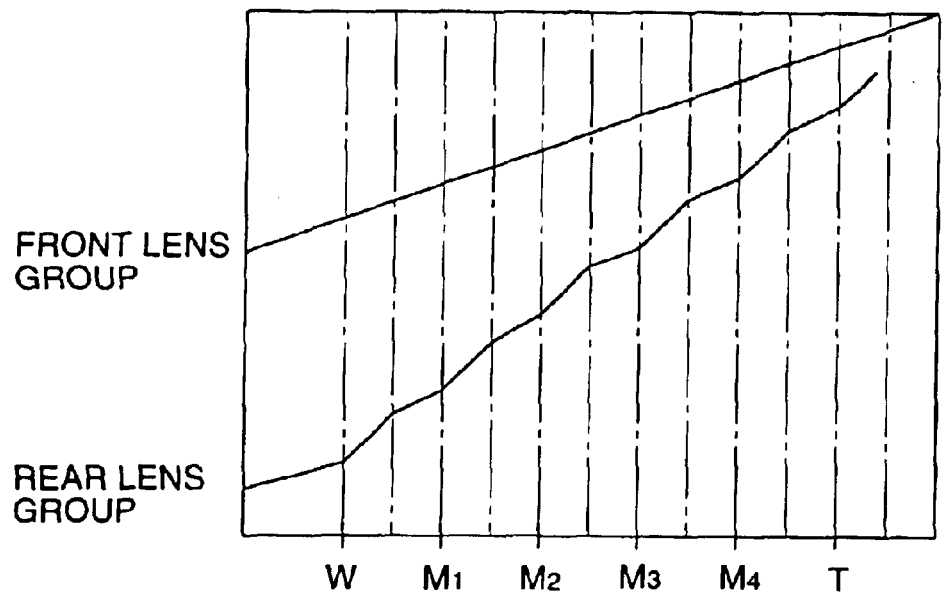
Figure 12:
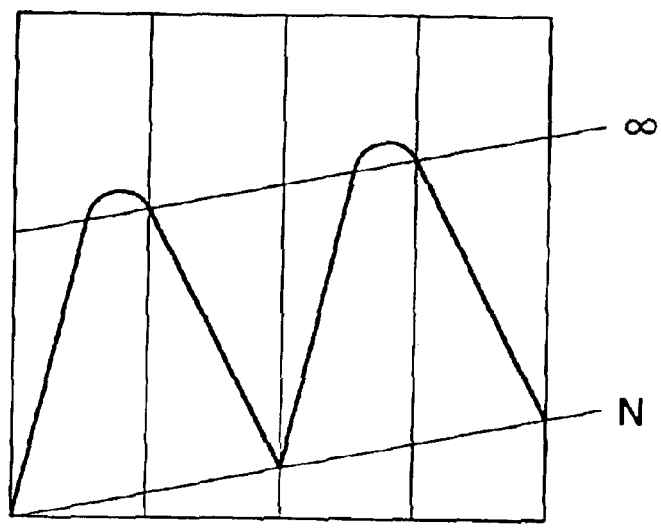
Figure 12:
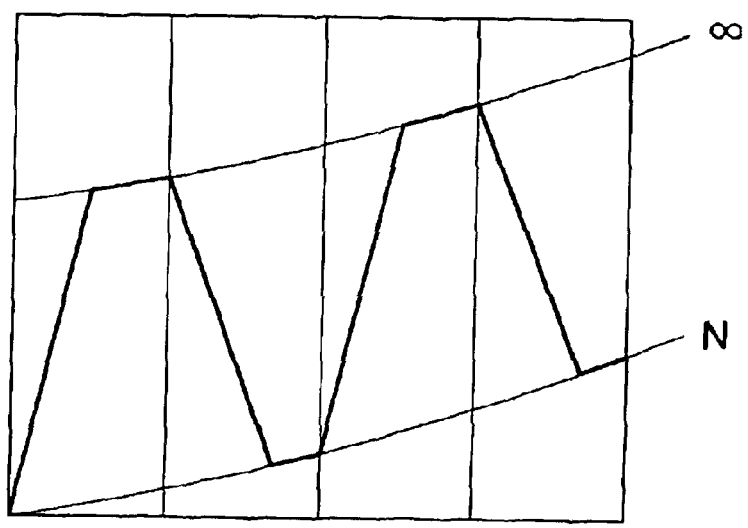

For example, as shown in FIG. 12(a), it is also an applicable structure that the rear lens group does not move in relative to the stationary barrel 1 even if the cam barrel is rotated, by establishing the inclination of the focusing region in such a direction (reverse to the direction for the subject) so as to cancel the inclination, toward the optical axis, of the male-helicoid 2a formed on the outer surface of the cam barrel 2.

On the other hand, as shown in FIG. 12(b), it is also an applicable structure that the rear lens group moves faster in relative to the stationary barrel 1 when the cam barrel is rotated, by establishing the inclination of the focusing region in a direction (the direction for the subject) inclined toward the optical axis.

Further, structures having such zooming diagrams as shown in FIGS. 12(C) and (d) are also applicable.

In addition, it is possible to employ five inclination types mentioned above to each of focusing regions separately.

Although, in the present example, the front lens group is moved linearly by means of the helicoidal engagement while the rear lens group is moved non-linearly on the saw-tooth shaped locus, it is also possible to reverse the relation between the front lens group and the rear lens group. Of course, it is also possible that both the front lens group and the rear lens group are moved non-linearly on the saw-tooth shaped locus.

The discrimination regions, based on variations of the zooming magnification factor (variable power factor) in substantially ⅓ of the stage, are established by splitting the focusing region into two regions and by including non-focusing regions such as $W_N$–$M_1$, $M_{1N}$–$M_2$, and $M_{2N}$–$T_N$. That is, the discrimination regions includes eight steps such as a region $W_M$ in which the zooming magnification factor is set at 1–1.3 times, a region $W_E$ at 1.3–1.7 times, a region $M_{1M}$ at 1.7–2.3 times, a region $M_{1E}$ at 2.3–2.7 times, a region $M_{2M}$ at 2.7–3.3 times, a region $M_{2E}$ at 3.3–3.7 times, a region $T_M$ at 3.7–4.3 times and a region $T_E$ at 4.3–4.7 times, respectively.

Further, the zooming magnification factors, each of which corresponds to each of the discrimination regions, are also established, including a region $W_M$ in which the zooming magnification factor is set at 1 times, a region $W_E$ at 1.5 times, a region $M_{1M}$ at 2 times, a region $M_{1E}$ at 2.5 times, a region $M_{2M}$ at 3 times, a region $M_{2E}$ at 3.5 times, a region $T_M$ at 4 times and a region $T_E$ at 4.5 times, respectively.

Incidentally, the variation of the zooming magnification factors in the region $M_{1M}$, the region $M_{2M}$ and the region $T_M$ are substantially ⅔ of the stage.

These discrimination regions comprise the first regions in which the conventional optical focusing is conducted and the second regions in which the enlarging image processing, being as a magnification change processing, is conducted after the optical focusing, and both regions are staggered side by side along the extending direction of the zoom lens. The first regions include the region $W_M$, the region $M_{1M}$, the region $M_{2M}$ and the region $T_N$, while the second regions include the region $W_E$, the region $M_{1E}$, the region $M_{2E}$, and the region $T_E$.

Next, there will be described the performance of the digital camera when the zoom lens is stopped at the reference position W after being extended from the stored position in the body. By pushing the release button 111, shown in FIG. 2, up to half its stroke, the release switch $S_1$ is turned into ON. Then, the ranging measurement circuit 79 is activated, and an infrared light is emitted from the infrared light emission window 104 and returns to the infrared light admitting window 106 after being reflected by the subject, so as to perform a ranging operation based on the principle of trigonometrical survey. Accordingly, the amount of extension (ranging data), which is required for focus adjustment, is outputted to the control section 71 by the ranging measurement circuit 79 which derives it from arithmetic processing of the detected distance to the subject and the reference position W.

When the release switch $S_2$ is turned into ON by further pushing the release button 111, the zoom lens 72 is extended up to a certain position within the region between W–$W_N$, corresponding to the calculated extension amount, and thus the image capturing is performed. Since the image signals photo-electrically converted by CCD 73 are further converted to the first image data by the image processing section 74, the first image data can be stored in the image memory 76 and/or displayed on the liquid-crystal monitor display 77 which corresponds to the liquid-crystal monitor display 121 shown in FIG. 3.

In the zooming operation, when the zoom switch $S_T$ is turned ON by pushing the zoom button 127, the normal rotation of the motor 81, activated by the driving section 82, extends the zoom lens 72 up to a certain position within the region between W–$T_N$, while, when the zoom switch $S_T$ is turned to OFF by releasing the zoom button 127, the zoom lens 72 stops at its current position.

During the zooming operation, images of the subject which are renewed at intervals of every 30 msec–300 msec, are sequentially displayed on the liquid crystal monitor display 77. For example, when the zoom lens 72 is parked at a stepping position W, $M_1$, $M_2$ or T, images of the subject based on the first image data are displayed on the liquid crystal monitor display 77. When the zoom lens 72 is located at a position other than the above stepping positions, the image processing section 74 applies an enlarging processing to the first image data on the basis of the positional information of the zoom lens 72 detected by the discrimination section 78, and images based on the processed image data are displayed on the liquid crystal monitor display 77. For this purpose, instead of the enlarging processing, it is also applicable to display a window frame corresponding to the magnification factor, or to display images of the subject in which an outer region of the image frame is processed by the color conversion processing.

While the zooming switch $S_T$ is turned ON, the encoder 83 is counting the generated pulse so that a discrimination section 78 discriminates in which discrimination region ($W_M$, $W_E$, - - - , $T_E$) the zoom lens 72 is currently moving.

Initially, there is described a case that the discrimination region, in which the zoom lens 72 is currently stopped, belongs to the first discrimination regions, for example, a case that the zoom lens 72 stops in the region $M_{1M}$. In this case, the zoom lens 72 automatically moves to the reference position $M_1$ by either forward or reverse rotation of the motor 81, and in the same way, moves to the reference position W for the region $W_M$, to the reference position $M_2$ for the region $M_{2M}$, to the reference position T for the region $T_M$, respectively. Then, turning the release switch $S_1$ into ON by pushing the release button 111 up to half its stroke, the ranging measurement circuit 79 derives the amount of extension from arithmetic processing of the detected distance to the subject and the reference position $M_1$, in the same way as mentioned above. Successively, turning the release switch $S_2$ into ON by further pushing the release button 111, the zoom lens 72 is extended up to a certain position within the region between $M_1$–$M_{1N}$, based on the derived amount of extension, and thus the image capturing is performed.

Next, there is described a case that the discrimination region, in which the zoom lens 72 is currently stopped, belongs to the second discrimination regions, for example, a case that the zoom lens 72 stops in the region $M_{1E}$. In this case, the zoom lens 72 automatically moves to the reference position $M_1$ as well by reverse rotation of the motor 81, and in the same way, moves to the reference position W for the region $W_E$, to the reference position $M_2$ for the region $M_{2E}$, to the reference position T for the region $T_E$, respectively. Since the zooming magnification factor in the region $M_{1E}$ is set at 2.5 times, the enlarging magnification factor, derived from the reference position $M_1$ having a magnification factor of 2.0 times, results in 1.25 times. Accordingly, the discrimination section 78 selects the enlarging magnification factor of 1.25 times from the data stored in the internal memory to send it to the control section 71, which sends the data to the image processing section 74.

Incidentally, the magnification factors, derived from the reference value and corresponding to each of the regions, are shown in Table 1. The discrimination section 78 memorizes them in its internal memory.

TABLE 1

| Regions | Zooming M.F. | Setting M.F. | M.F. at Reference Position | Enlarging M.F. |
|---|---|---|---|---|
| $W_E$ | 1.3–1.7 | 1.5 | 1.0 (W) | 1.50 |
| $M_{1E}$ | 2.3–2.7 | 2.5 | 2.0 ($M_1$) | 1.25 |
| $M_{2E}$ | 3.3–3.7 | 3.5 | 3.0 ($M_2$) | 1.17 |
| $T_E$ | 4.3–4.7 | 4.5 | 4.0 (T) | 1.13 |

M.F.: Magnification Factor

Then, turning the release switch $S_1$ into ON by pushing the release button 111 up to half its stroke, the ranging measurement circuit 79 derives the amount of extension from the arithmetic processing of the detected distance to the subject and the reference position $M_1$, in the same way as mentioned above. Successively, turning the release switch $S_2$ into ON by further pushing the release button 111, the zoom lens 72 is extended up to a certain position within the region between $M_1$–$M_{1N}$, based on the derived amount of extension, and thus the image capturing is performed. At this time, the image signals opt-electrically converted by CCD 73 are further converted to the first image data by the image processing section 74, and the first image data is sent to an electronic zoom processing section 75 in which the second image data is generated by applying the enlarging processing to the first image data based on the enlarging magnification factor of 1.25 times sent from the control section 71. Then, the electronic zoom processing section 75 outputs the second image data to the image processing section 74. Thereafter, the second image data can be stored in the image memory 76 and/or displayed on the liquid-crystal monitor display 77 which corresponds to the liquid-crystal monitor display 121 shown in FIG. 3.

As mentioned above, since the first regions and the second regions are staggered side by side along the extending direction of the zoom lens, twice the number of zooming steps of conventional cameras can be provided within the limited regions for zooming operation. This fact makes it possible for user to widen the scope of the focal length selection.

In the extended state of the zoom lens 72, when the zoom switch $S_W$ is turned ON by pushing the zoom button 127, the reverse rotation of the motor 81, activated by the driving section 82, withdraws the zoom lens 72. When the zoom switch $S_W$ is turned to OFF, the zoom lens 72 stops at a certain position within one of the regions. Then, the zoom lens 72 voluntarily moves and stops at the reference position, after the current region is memorized in the discrimination section 78.

In regard to the view finder, it is desirable to employ an optical zoom finder which can be driven by a motor, etc. so that the magnification factor of the optical zoom finder coincides with that derived from the position information, designating the discrimination region in which the zoom lens currently stops, sent from the discrimination section 78.

According to the abovementioned configuration, while the zoom lens is extended by pushing the zooming button, the operator would feel as if the focal length of the zoom lens varies continuously, though the real focal length varies in a step by step fashion. Therefore, it is possible to provide a camera which does not give any sense of incongruity to the operator, and is easy in operation.

Further, it is possible for the user to obtain high quality images which are substantially equivalent to the desired images of the subject captured at arbitrary focal lengths by the user (for example, even if the focal length is between stepped positions), irrespective of any situations in regard to the design of the step zooming camera.

THE SECOND EXAMPLE

Next, the second example of the digital camera will be described in the following.

In this digital camera, a desired zooming magnification factor, selected from the stepping discrimination regions such as, e.g., 1, 1.5, 2, 2.5, 3, 3.5, 4, 4.5, 5, is previously displayed on the liquid-crystal display panel 112. Then, the zoom lens 72 is extended to the reference position corresponding to the selected discrimination region. If the selected discrimination region belongs to the first regions, the image capturing is conducted after focus adjustment and the first image data is outputted. While, if the selected discrimination region belongs to the second regions, after the image capturing is conducted with focus adjustment and the first image data is outputted, the second image data, to be outputted, is generated based on the enlarging magnification factor derived from the reference position memorized in the discrimination section 78, in the same way as aforementioned.

According to the second example, it becomes possible to further suppress the power dissipation of the camera, since the zoom lens 72 arrives at the reference position without moving forward and backward after the magnification factor is set.

THE THIRD EXAMPLE

Figure 13:
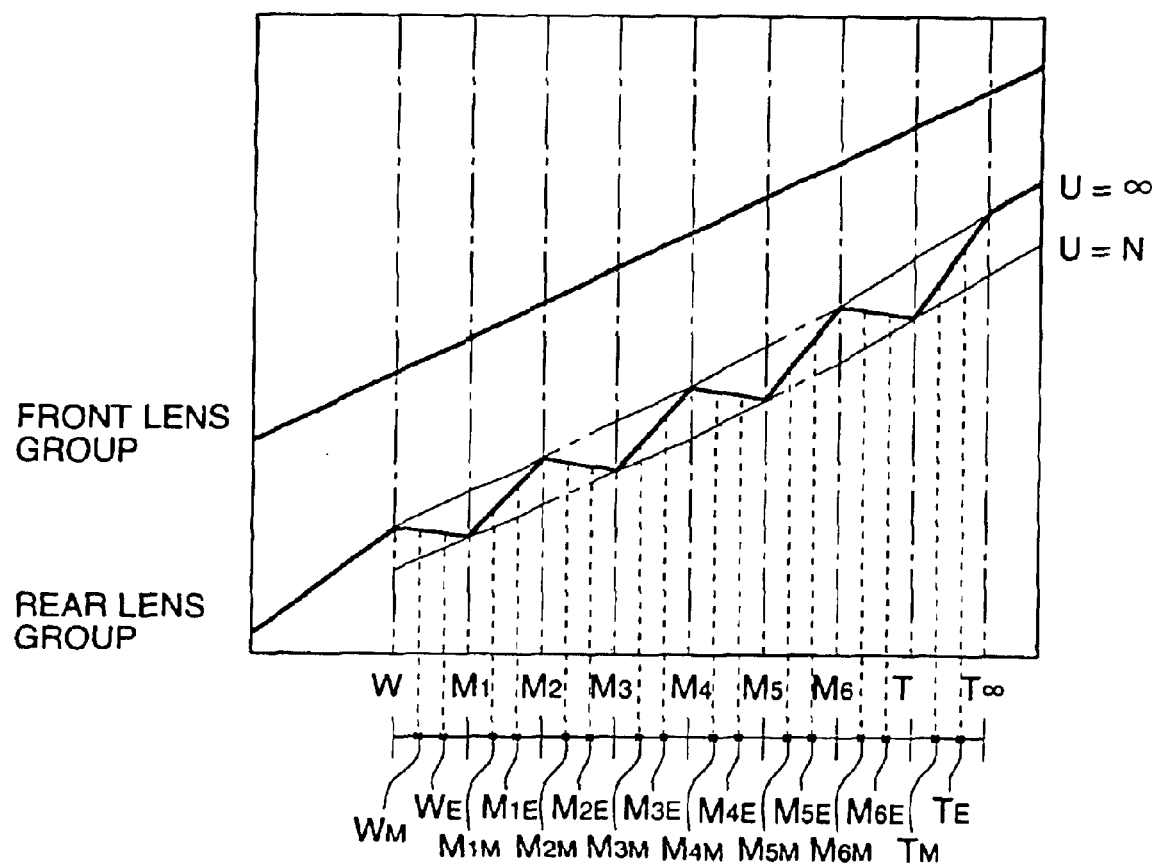
FIG. 13 shows another example of a zooming diagram embodied in the present invention.

In the above explanation of the first and second examples, an example of the zooming diagram shown in FIG. 11 has been referred to. The present invention is also applicable to a camera having a zooming diagram as shown in FIG. 1 (and described as follow). In this case, as shown in FIG. 13, it is also possible to divide regions into the first regions and the second regions as well.

Although the camera which employs the zoom lens with four zooming steps has been described in the above, the number of zooming steps is not limited to four zooming steps. It is also possible to voluntarily establish a plurality of zooming steps, depending on the diameter of the cam barrel 2 and/or the dimension of the cam which is formed in accordance with its rotational angle.

In addition, instead of employing a zoom lens which covers all stroke of it with the step zooming, it is also possible to employ a zoom lens having such a structure that the focus adjustment is not performed in the region of the fixed focal length, namely the region of the short focal length where the depth of focus to the subject is deep, while the step zooming is performed only in the region of the long focal length where the depth of focus to the subject is shallow.

According to the first, second and third examples mentioned above, it is possible to provide an image capturing apparatus which attains such advantages as high quality images, small size, light weight, low power dissipation as well as low cost, by means of a stepped zoom operation having many steps, which is realized by performing the magnification image processing in addition to the optical image formation, instead of mounting another focusing mechanism.

THE FOURTH EXAMPLE

The inventors of the present invention, however, have noticed that the following problems will arise if the abovementioned zoom lens barrel is employed as it is for a digital camera.

In digital cameras, light reflected from a subject is projected and focused on a CCD by means of the shooting lens, and converted to image signals by the photo-electric converting action of the CCD. After appropriate image processing is applied to the photo-electric converted image signals, the subject image is displayed on a monitor comprising a liquid-crystal plate, etc. Accordingly, it is possible to directly view the state of variable power in zooming operation as well as it is in a single-lens reflex camera, since the image displayed on a liquid-crystal monitor is the subject image projected on the CCD through the shooting lens.

On the other hand, in a zoom lens barrel using the abovementioned step zooming method, both front and rear lens groups move during the focusing operation, and also vary the focal length. Therefore, the magnification factor of the captured image varies before as well as after the focus adjustment. In conventional digital cameras, by pushing the release button to the first stage of its stroke, the first release switch is turned ON, and the ranging operation for measuring the distance to the subject and the photometry operation for measuring the reflected light intensity of the subject are performed. By further pushing the release button to the second stage of its stroke, the second release switch is turned ON, and whereby the zoom lens barrel is driven based on the ranging result. After the focusing operation, the captured image is projected onto the CCD.

Accordingly, the magnification factor of the image displayed on the liquid crystal monitor before the second stage of the release switch is turned ON is different from that after the second stage of the release switch is turned ON. As a result, the user feels a sense of incongruity, when he views the liquid crystal monitor. In addition, since the actual captured image is enlarged compared to the image initially viewed by the user, there is a problem such that the peripheral image viewed by the user before focus adjustment is not actually captured within the image frame after focus adjustment.

Further, if a compatible digital camera, in which a silver-halide film can be loaded, is used by the user, failed photos with unintentional image frames would be captured by the user, since the actual printed image is different from the image intended by the user.

To overcome the abovementioned problems, it may be applicable that the shooting lens is driven based on the ranging result when the first release switch is turned ON, and the monitor displays the captured image to be viewed by the user. In digital cameras, however, the image capturing circuit, the monitor, etc., which dissipate a large amount of power, are driven by a battery with a relatively small capacity. Therefore, when employing the above method, there is a risk that it becomes impossible to shoot the subject when the second release switch is turned ON, since the dissipation of the battery progresses rapidly.

The fourth example of the present invention is attained in view of the abovementioned problems. The inventors propose an image capturing apparatus which incorporates a zoom lens barrel employing a step zooming method in the digital camera, etc., and displays the same images on the liquid crystal monitor as those when the zoom lens barrel moves, without any actual movement of the zoom lens barrel, when the first release switch is turned ON by pushing it up to the first stroke of it.

Incidentally, in silver-halide film cameras which employ a zoom lens barrel in a step zooming method, since the optical view finder system is equipped as being independent of the shooting lens optical system, various ideas have been applied for the design of the optical view finder system to avoid the influence of the aforementioned variable power operation.

In the present example, zooming and focusing operations of the zoom lens barrel, in which focal regions for focusing operation are provided in a plurality of variable power regions for zooming operation, are achieved by driving the front lens group 5 and the rear lens group 7. When either zooming or focusing is operated, the rotational driving force of the motor 31 started by a command signal (not shown) is transmitted to the fifth gear 43 through a gear train including gears 35, 36, 37, 38 and 42. Then, the fifth gear 43 transmits the rotational driving force to the driving gear 44 attached to the straight moving guide 21. The driving gear 44 is engaged with the large gear 2b to move the cam barrel 2, which is helicoidally engaged with the stationary barrel 1, in a direction of the optical axis by rotating the cam barrel 2. At this time, the cam barrel 2 is propelled either forward or backward in response to the rotating direction of the motor 31. Although the straight moving guide 21 is integrally attached to the rib 2e of the cam barrel 2 by means of the guide fixing plate 22, the guide fixing shaft 23 and the fixing screw 24, the straight moving guide 21 is only movable in the direction of the optical axis, since the rotation of the straight moving guide 21 is prevented by means of both left and right protrusions 21a linked the guide slot 1b of the stationary barrel 1. In the same manner, the rotation of the front group moving frame 3 is also prevented by means of the arms 21c of the straight moving guide 21. In addition, the rotation of the rear group moving frame 6 is also prevented associating with the front group moving frame 3, since the guide shaft 11 protruding from the rear group moving frame 6 penetrates through the front group moving frame 3. Accordingly, when the cam barrel 2 moves with its rotation, the front group moving frame 3, which is helicoidally engaged with the cam barrel 2, and the rear group moving frame 6, which is cam-engaged with the cam barrel 2, move either forward or backward only in the direction of the optical axis without rotations.

Incidentally, since the cam groove 2d of the cam barrel 2 is formed in such a manner that its inclination angles smaller or larger than the lead angle of the female helicoid 2c are repeatedly staggered, the rear group moving frame 6 moves in a non-linear mode like saw-tooth shape, though the front group moving frame 3 moves in a linear mode by means of the helicoid drive. As is same as the aforementioned zooming diagram referred in FIG. 1, since focal regions for the focusing operation are provided in a plurality of variable power regions for the zooming operation, the focusing drive and the zooming drive can be achieved by the same mechanism.

Although the engaging position of the fifth gear 43 with the driving gear 44 varies in accordance with the movement of the cam barrel 2, the long tooth of the fifth gear 43, extended to the optical axis, make it possible to maintain the engagement with the driving gear 44 irrespective of the movement of the cam barrel 2. Further, the rib 2e of the cam barrel 2 also acts as a bearing surface to support the rotation of the cam barrel 2 in addition to being a thrust stopper of the straight moving guide 21 to prevent the deformation of the cam barrel 2 while the driving force is transmitted.

In the present example, a zoom lens comprised of two lens groups has been described in the above. The present invention is also applicable for a zoom lens comprised of more than two lens groups.

Figure 6:
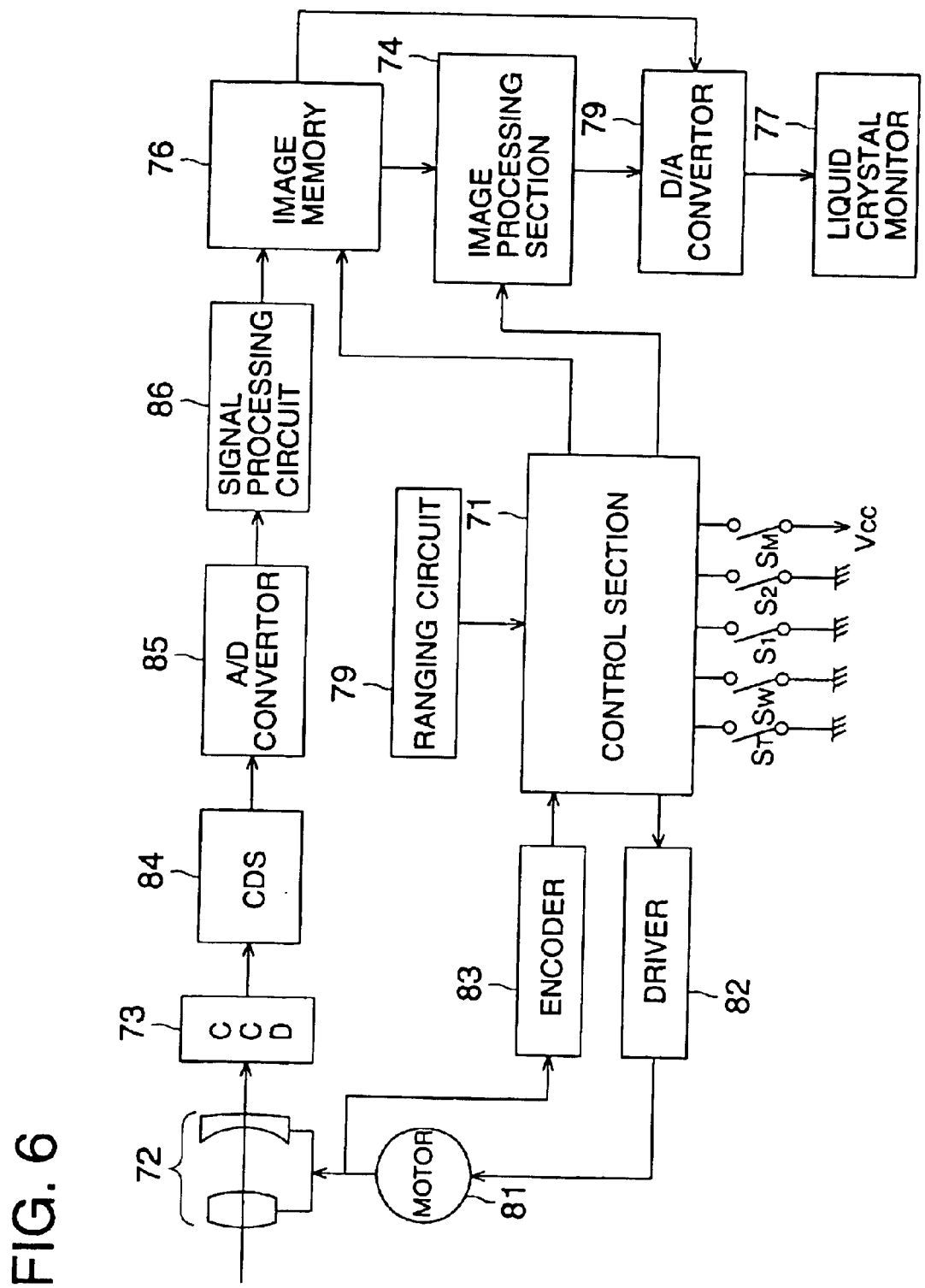
FIG. 6 shows a block diagram of an image processing circuit.
Figure 7:
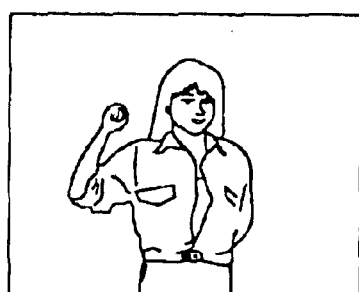
FIGS. 7(A), (B), (C) and (D) show exemplified images which are displayed on a liquid crystal monitor display.
Figure 7:
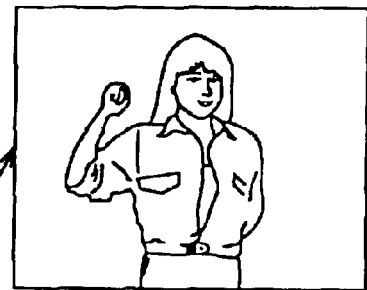
Figure 7:
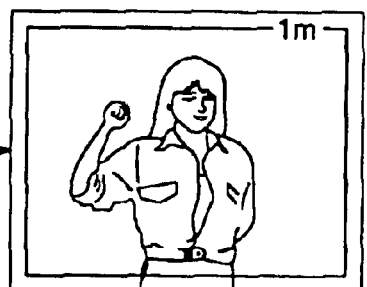
Figure 7:
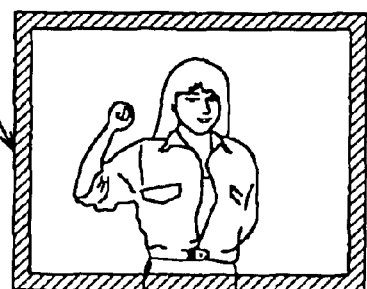

Next, image processing, which applies to subject images captured by the aforementioned zoom lens barrel, will be described in the following, referring FIGS. 6 and 7. FIG. 6 shows a block-diagram of a image processing circuit, while FIG. 7 shows images which are displayed on the liquid-crystal monitor.

When a main switch $S_M$, shown in FIG. 6, is turned to the ON status by pushing the main switch button 122, shown in FIG. 3, electrical power is fed to a control section 71, and the digital camera enters its active status. At such time, since the zoom lens is located in its stored position and is in a defocusing status on any subject, CCD 73 does not perform a photo-electric conversion, even if the subject image is incoming to CCD 73. Therefore, the dissipation of the battery is prevented cutting the power supply to the signal processing circuit 86, the image processing section 74, the liquid-crystal monitor 77, etc.

When the digital camera enters its active status, a motor 81 starts its rotation, driven by a driving section 82 and the zoom lens 72 is extended from the main body of the digital camera. Then, the zoom lens 72 is stopped at a position W by means of an encoder 83. At the same time, electrical power is initially fed to all of the circuits to activate them as well as the control section 71.

The subject image is projected and focused on CCD 73 by mean of the zoom lens 72, and converted to image signals by the photoelectric converting action. The photo-electric converted image signals are processed with a correlation double sampling in CDS 84, and then converted to digital signals by means of A/D convertor 85. Successively, the digital signals are further processed by, e.g., a γ processing be dividing it into chrominance and luminance signals, to be outputted a first image data. The first image data passthrough a RAM and/or an image memory 76 serving as a RAM card, and by-pass the image processing section 74 (described later). Then, the first image data are further converted to analog signals by means of D/A convertor 79, to be sent to and displayed on a liquid-crystal monitor display 77, which corresponds to the liquid-crystal monitor display 121 in FIG. 3.

Incidentally, regarding the liquid-crystal monitor display 121, it makes essentially no difference to employ a plasma-display, etc. instead of the liquid-crystal.

Further, in the abovementioned embodiment, CDS 84, A/D convertor 85 and the signal processing circuit 86 correspond to the first image processor in the present invention.

When only the main switch $S_M$ is turned to the ON status, the zoom lens 72 does not perform a focusing action, since the ranging measurement circuit 79 has not been activated. Therefore, when the zoom lens 72 is located at the position W shown in FIG. 1, the focal point of the zoom lens 72 is set at infinity (∞) as its initial position, even if the subject is located at the near position (N) of the camera. On the other hand, when the position of the zoom lens 72 is located at the position $M_1$, the focal point of the zoom lens 72 is set at the near position (N), even if the subject is located at infinity (∞).

Next, for capturing the image of a subject, the user operates the zooming button 127, shown in FIG. 3, by voluntarily turning the zooming switch $S_T$, $S_W$ to its ON status. Then, the driving section 82 activates the rotation of the motor 81 to drive the zoom lens 72, which will be stopped at one of the stepping positions W through T, shown in FIG. 1, in accordance with the detected result of the encoder 83, namely, it will be stopped at an initial position of the variable power regions. Incidentally, the motor 81 and the encoder 83 correspond to the motor 31 and the photo-interrupters 34, 41 shown in FIG. 4, respectively.

When either the zooming switch $S_T$ or $S_W$ is turned ON status, the subject images which are focused on the CCD 73 are displayed on the liquid crystal monitor display 77, at intervals of every 30 msec–300 msec, as mentioned before. That is, it is possible to view the changing subject images according as the movement of the zoom lens 72 on the liquid crystal monitor display 77. The sequential timing of image display on the liquid-crystal monitor display 77 is obviously not limited to the abovementioned switching interval. It may also be desirable to employ a switching interval such that the user does not feel any sense of incongruity for switching of the displayed images. Accordingly, it is possible for the user to select a variable power region for an appropriate image size by viewing the subject image on the liquid-crystal monitor display 121. In addition, the selected variable power region is inputted into the control section 71, as information of variable power region.

By pushing the release button 111, shown in FIG. 2, up to half its stroke, a release switch $S_1$ is turned ON. Then, the ranging measurement circuit 79 is activated, and an infrared light is emitted from the infrared light emission window 104, and returns to the infrared light admitting window 106 after being reflected by the subject, so as to perform a ranging operation based on the principle of the trigonometrical survey. Thus, the ranging information derived from detection and calculation of the subject distance is outputted to the control section 71. At this time, however, the focusing operation of the zoom lens 72 has not been activated yet. The zoom lens 72 is still stopped at an initial position of the variable power regions, while the control section 71 sends the ranging information to the image processing section 74, and interrupts the transmission of the first image data from the image memory 76.

As aforementioned while mainly referring to FIG. 1, in the step zooming method of the present examples, since the variable power operation is performed in association with the focus adjustment, it is required that the image displayed on the liquid-crystal monitor display 77 should be processed by the magnification change processing in accordance with the focus adjustment, even if the zoom lens 72 does not actually move for focus adjustment when the release switch $S_1$ turns to ON. Therefore, in the image processing section 74, the image processing, described as follow, is performed by calculating the image magnification factor which varies after the focus adjustment from the initial position before the focus adjustment, based on the ranging information and the variable power information which designates the variable power region selected by the zooming operation of the control section 71.

Incidentally, in the present example, the image processing section 74 corresponds to the second image processor in the present invention.

FIG. 7(A) shows an exemplified image displayed on the liquid-crystal monitor display 77, before the release switch $S_1$ is turned ON. When the release switch $S_1$ is turned ON, the image magnification factor after the focus adjustment is obtained by the image processing section 74, based on the ranging information and the variable power information which are selected by the zooming operation, and then the magnification change processing for the first image data is performed. In the present example, the magnification change processing is equivalent to the enlarging processing, since the focus adjustment operation is always performed in the direction from a short focal length to a long focal length.

Then, the peripheral image, which cannot be contained within the predetermined image frame, is cut out, and the resulted image is enlarged to obtain the image as shown in FIG. 7(B). The size of the enlarged image just mentioned above is the same as that of the image which will be displayed on the liquid-crystal monitor display 77 through the following steps: turning the release switch $S_2$ to ON by further pushing the release button 111 (to the second stage of the pushing stroke); the control section 71 activates the driver 82 and the encoder 83 based on the ranging information sent from the ranging measurement circuit 79; and the motor 81 drives the zoom lens 72 so as to move it to the focal point for CCD 73. Therefore, since it is possible to display the image, having an image size enlarging factor equivalent to that of the image really captured by the user, on the liquid-crystal monitor display 77, merely by pushing the release button 111 to half its stroke, there is no such a problem that the enlarging factor varies depending on either ON or OFF of the release switch $S_2$. Further, it is also possible to suppress the power dissipation of the camera battery to a minimum level, since there is no need to drive the zoom lens when pushing the release button to half its stroke.

Alternatively, as shown in FIG. 7(C), instead of applying the enlarging processing to the first image data, it is also applicable to obtain a position of a window frame by means of the image processing section 74 so as to display a window frame, corresponding to the enlarging factor obtained by the image processing section 74, which designates a boundary between the effective image area and the peripheral image to be cut out, which cannot be contained within the predetermined image frame. As a result, the image displayed within the window frame is similar to the image really captured by the user, when turning the release switch $S_2$ to ON.

Further, as shown in FIG. 7(D), instead of applying the enlarging processing to the first image data as well, it is also applicable to clarify the outer area of the image frame, namely, the region out of the captured image, by applying the color conversion processing to the peripheral image area by means of the image processing section 74, corresponding to the enlarging factor, so as to superpose a predetermined color on the peripheral image to be cut out, which cannot be contained within the predetermined image frame. Alternatively, instead of the color conversion processing, it is also acceptable to apply image processing which superposes a kind of pattern, such as a mesh-pattern, etc. by means of the image processing section 74. As a result, the image displayed within the image frame is substantially similar to the image really captured by the user, when turning the release switch $S_2$ to ON.

Incidentally, it is applicable that the image data processed as shown in FIG. 7(B), (C), (D) is defined as the second image data, which is not only instantaneously displayed on the liquid-crystal monitor display 77, but is also displayed on the liquid-crystal monitor display 77 at a voluntary time after the image capturing, by storing the second image data into the image memory 76.

When the release switch $S_2$ is turned ON by further pushing the release button 111, the control section 71 activates the driver 82 and the encoder 83 on the basis of the ranging information, and the zoom lens 72 is moved to the position of the focal point for CCD imager 73 by means of the motor 81. As a result, after the image signals is processed in CDS 84, A/D convertor 85 and the signal processing circuit 86 as aforementioned, the image data, which is photo-electrically converted from the true image really captured by the user, are stored into the image memory 76 as a third image data. Then, the image is displayed on the liquid-crystal monitor display 77 by converting the image data into the analog signals by means of the D/A convertor 79 without passing through the image processing section 74.

In the enlarging processing as shown in FIG. 7(B), after the focus adjustment, it is applicable to display the image on the liquid-crystal monitor display 77 based on either the second image data or the third image data, since both image data are the same as far as the subject or the digital camera does not move. In the image processing as shown in FIG. 7(C) or FIG. 7(D), however, the image displayed before the focus adjustment is an image such as shown in FIG. 7(C) or FIG. 7(D), and the image displayed after the focus adjustment is different from the image shown in FIG. 7(B), though they resemble each other. Accordingly, after the focus adjustment, it will be less confusions to the user to display the image based on the second image data without displaying the image based on the third image data.

THE FIFTH EXAMPLE

In the fourth example, it is assumed that the sequential timing of the subject images displayed on the liquid-crystal monitor display 77 is every 30 msec–300 msec. Next, another example will be described as follows. In the following description, only the configurations which are different from those of the fourth example will be described, and other configurations are to be regarded as the same as those employed in the fourth example.

For example, assuming that the zoom lens 72, located at the stepping position W in the zooming diagram shown in FIG. 1, is moved to the stepping position T by operating the zooming button 127 shown in FIG. 2, the focal positions of subject images displayed on the liquid crystal monitor display 77 are different from each other, when the sequential timing of the subject images displayed on the liquid-crystal monitor display 77 is an arbitrary timing such as every 30 msec–300 msec, etc.

Specifically, when the stepping position is moved from W to $M_1$, the focal position varies from ∞ to N, and when moved from $M_1$ to $M_2$, the focal position varies from N to ∞. Accordingly, when the sequential timing of the subject images is faster than the moving time of the zoom lens 72 between adjacent stepping positions, the subject images are displayed on the liquid-crystal monitor display 77, varying according as the order of: a subject image focused on ∞ (a subject image captured at a time when the zoom lens 72 is located at the stepping position W); a subject image focused between ∞ and N (a subject-image captured at a time when the zoom lens 72 is located between the stepping positions W and $M_1$); a subject image focused on N (a subject image captured at a time when the zoom lens 72 is located at the stepping position $M_1$); a subject image focused between N and ∞ (a subject image captured at a time when the zoom lens 72 is located between the stepping positions $M_1$ and $_{M2}$); a subject image focused on ∞ (a subject image captured at a time when the zoom lens 72 is located at the stepping position $M_2$). That is, the focal positions of the subject images displayed on the liquid-crystal monitor display 77 vary in transition such as $$\infty \to N \to \infty \to \ldots \to \infty.$$

During zooming operations (switching of the focal length), it is desirable to display the subject images on the liquid-crystal monitor display 77, reflecting the variations of the image frames associated with the variations of the focal length. As it is, however, it may give a disagreeable feeling to the user or arise a confusion of the user that the focal position also varies corresponding to the variation of the focal length as described above.

To overcome the above shortcoming, in the present example, only the subject image, which is captured at the time when the zoom lens 72 is located at the predetermined focal region, is displayed on the liquid-crystal monitor display 77.

Initially, there will be described an exemplified case that the zooming button 127 is pushed when the zoom lens 72 is located at the stepping position W, and is released when the zoom lens 72 arrives at the stepping position T.

When the zoom lens 72 is located at the stepping position W, the subject image projected on CCD 73 is focused on ∞. Then, the subject image at the stepping position W is displayed on the liquid-crystal monitor display 77, as described in the fourth example. Further, the zoom lens 72 then moves to the stepping position $M_1$. The subject image is not outputted to the liquid-crystal monitor display 77 at the time when the zoom lens 72 is located at the stepping position $M_1$, since the subject image captured at the time when the zoom lens 72 is located at the stepping position $M_1$ is focused on N. Further, at the time when the zoom lens 72 arrives at the stepping position $M_2$, the subject image projected on CCD 73 is outputted to the liquid-crystal monitor display 77. In the same way, at the time when the zoom lens 72 arrives at the stepping positions $M_4$, $M_6$, the subject image projected on CCD 73 is outputted to the liquid-crystal monitor display 77.

Since the subject images outputted to the liquid-crystal monitor display 77 are captured at the time when the zoom lens 72 is located at one of the stepping positions W, $M_2$, $M_4$, $M_6$, all of them are focused on being the predetermined focal regions. Therefore, it becomes possible for the user to view the subject images focused on the same position without any disagreeable feeling and/or confusion.

Next, there will be described an exemplified case that zooming button 127 is pushed when the zoom lens 72 is located at the stepping position $M_1$, and is released when the zoom lens 72 arrives at the stepping position T.

In the same way as described above, when the zoom lens 72 is located at the stepping position $M_1$, the subject image projected on CCD 73 is focused on N. Then, the subject image at the stepping position $M_1$ is displayed on the liquid-crystal monitor display 77, as described in the fourth example. Further, the zoom lens 72 moves to the stepping position $M_2$. The subject image is not outputted to the liquid-crystal monitor display 77 at the time when the zoom lens 72 is located at the stepping position $M_2$, since the subject image, captured at the time when the zoom lens 72 is located at the stepping position $M_2$, is focused on ∞. Further, at the time when the zoom lens 72 arrives at the stepping position $M_3$, the subject image projected on CCD 73 is outputted to the liquid-crystal monitor display 77. In the same way, at the time when the zoom lens 72 arrives at the stepping positions $M_5$, T, the subject image projected on CCD 73 is outputted to the liquid-crystal monitor display 77.

Since the subject images outputted to the liquid-crystal monitor display 77 are captured at the time when the zoom lens 72 is located at one of the stepping positions $M_1$, $M_3$, $M_5$, T, all of them are focused on N being the predetermined focal regions. Therefore, it becomes possible for the user to view the subject images focused on the same position without any disagreeable feeling and/or confusion.

Although, in the above examples, the subject images, projected on CCD 73 at the time when the zoom lens 72 is located at one of the predetermined stepping positions, are displayed on the liquid-crystal monitor display 77, it is also applicable to output the subject images to the liquid-crystal monitor when the zoom lens 72 is located between the stepping positions, e.g., every time when the zoom lens 72 arrives at a certain focal position (e.g., "A" meter focal position) in predetermined focal regions. For example, by outputting the subject images projected on CCD 73 to the liquid-crystal monitor display 77 every time when the zoom lens 72 is located at a 3 meter focal position which is a predetermined finite distance between N and ∞, it becomes possible to double the displayed images, compared to the above case in which images are captured and outputted every time when the zoom lens 72 arrives at N. Thus, the displayed image becomes more similar to a moving image.

It is also preferable that the subject images, projected on CCD 73 at the time when the zoom lens 72 is located at one of the stepping positions, are outputted to the liquid-crystal monitor display 77, since it may simplify the timing control system.

In the same way as described above, referring to the zooming diagram shown in FIG. 1, a case in which the zooming diagram shown in FIG. 9 is applied will be described as follows.

For example, assuming that the zoom lens 72, located at the stepping position W in the zooming diagram shown in FIG. 9, is moved to the stepping position T by operating the zooming button 127 shown in FIG. 2, the focal positions of subject images displayed on the liquid crystal monitor display 77 are different from each other, when the sequential timing of the subject images displayed on the liquid-crystal monitor display 77 is an arbitrary timing such as every 30 msec–300 msec, etc.

Specifically, in the zooming diagram shown in FIG. 9, when the stepping position moves from W to $\hat{1}$, from $M_1$ to $\hat{2}$, and from $M_2$ to $\hat{3}$, the focal position varies from ∞ to N, and when it moves from $\hat{1}$ to $M_1$, from $\hat{2}$ to $M_2$, and from $\hat{3}$ to T, the zooming operation is performed.

Accordingly, e.g., when the subject images are outputted during the zooming operation, the images displayed on the liquid-crystal monitor display 77 are out of focus.

When the sequential timing of the subject images is faster than the moving time of the zoom lens 72 from the stepping position W to $\hat{1}$, from $M_1$ to $\hat{2}$, or from $M_2$ to $\hat{3}$, the subject images are displayed on the liquid-crystal monitor display 77, varying according as the order of: a subject image focused on ∞ (a subject image captured at a time when the zoom lens 72 is located at the stepping position W); a subject image focused between ∞ and N (a subject image captured at a time when the zoom lens 72 is located between the stepping positions W and $\hat{1}$); a subject image focused on N (a subject image captured at a time when the zoom lens 72 is located at the stepping position $\hat{1}$). The above transition is the same as that from $M_1$ to $\hat{2}$, or from $M_2$ to $\hat{3}$. That is, the focal positions of the subject images displayed on the liquid-crystal monitor display 77 vary in transition such as ∞→N→out of focus→∞→N→out of focus→ . . . →N.

During zooming operation (switching of the focal length), it is desirable to display the subject images on the liquid-crystal monitor display 77, reflecting the variation of the image frame associated with the variation of the focal length. As it is, however, it may give a disagreeable feeling to the user or arise a confusion of the user that the focal position also varies corresponding to the variation of the focal length, as described above.

To overcome the above shortcoming, in the same way as described referring FIG. 1, only the subject image, which is captured at a time when the zoom lens 72 located at a predetermined focal position, is displayed on the liquid-crystal monitor display 77.

According to the abovementioned examples, in a region out of the predetermined focal region, the subject image focused at the just previous focal region is displayed on the liquid-crystal monitor display 77. In the following configuration, however, it is possible to display the subject image on the liquid-crystal monitor display 77, corresponding to the position of the zoom lens 72, even in a region out of the predetermined focal region.

For example, initially, the position of the zoom lens 72 is detected by means of the encoder 83. Then, based on the detected position of the zoom lens 72, the magnification factor of the subject image captured at the just previous focal region is derived, and the image processing section 74 applies the magnification processing to the subject image captured at the just previous focal region.

Accordingly, any disagreeable feeling and/or confusion for the user would be reduced further, since it becomes possible to display the subject image which is focused on a constant position and has an image frame varying in response to the movement of the zoom lens 72.

In the same way as described in the fourth example, instead of the enlarging processing, it is also applicable to display a window frame corresponding to the magnification factor, or to display the subject images in which an outer region of the image frame is processed by the color conversion processing.

THE SIXTH EXAMPLE

Up to now, an example of a digital camera has been described. In the following, a digital camera compatible with a silver-halide film will be described, referring to FIG. 8, which shows an optical system of a camera which is compatible with both a CCD imager and a silver-halide film. In this configuration, the optical system with regard to the CCD is common to that of the aforementioned digital camera.

Figure 8:
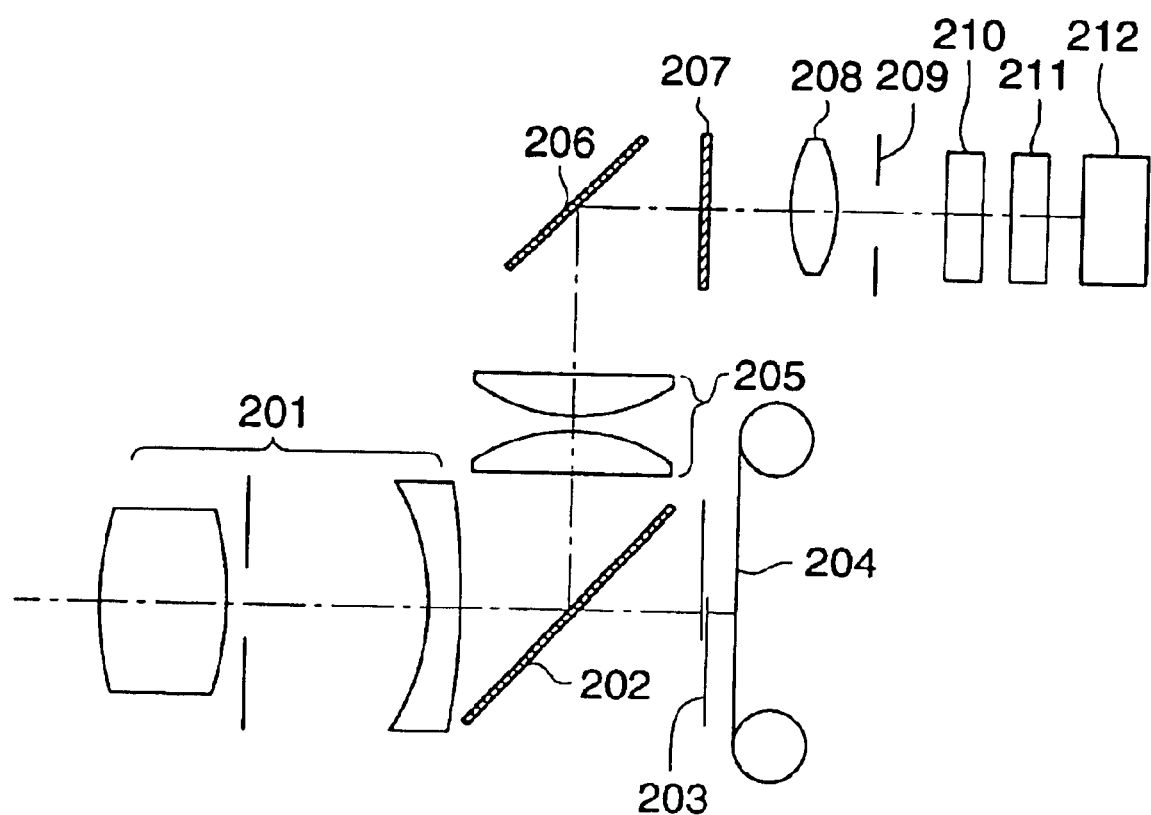
FIG. 8 shows an optical system configuration of a camera being compatible with both CCD and silver-halide film.

In FIG. 8, numerals 201, 202 and 203 are a zoom lens similar to the one mentioned before, a stationary half-mirror and a shutter, respectively. When the shutter 203 is opened, some of the light coming from the subject is exposed on the film 204, after passing through the stationary half-mirror 202.

Another part of the light coming from the subject is reflected by the stationary half-mirror 202 so as to propagate along the optical path comprised of a condenser lens 205, a reflecting mirror 206, an ND filter 207 and a relay lens 208. A relay aperture 209 controls the light intensity coming from the relay lens 208, and then, the focal image is projected on CCD 212 through an optical low-pass filter 210 and an IR cutting filter 211.

In the abovementioned digital camera which is compatible with the silver-halide film, when the first release switch is turned ON, the image with an image frame really captured by the user is displayed on the liquid-crystal monitor, and successively, when the second release switch is turned ON, the film is exposed by the light with opening of the shutter. Thus, the camera can prevent the user from capturing an image with an unintentional image frame in advance.

According to the fourth and fifth examples, the digital camera, which employs a zoom lens barrel of the stepping zoom method, does not cause any sense of incongruity for the user, since the display section, comprised of the liquid crystal monitor, etc., displays the same image after focus adjustment as that before focus adjustment. In addition, it is possible to provide an image capturing apparatus which has advantages such as high image quality, small-size, light weight, low power consumption and low price, and which does not have a problem such that a peripheral image displayed before focus adjustment is not actually captured within an image frame after focus adjustment.

Further, it is possible to prevent dissipation of the battery, since a zoom lens barrel is driven only at the moment of shooting.

According to the sixth example, it is also possible to provide a digital camera compatible with a silver-halide film, which can prevent the user from capturing an image with an unintentional image frame in advance.

According to the present invention, it is possible that a zooming mechanism and a focusing mechanism are integrated into a single configuration of the same mechanism. As a result, it becomes possible to provide an image capturing apparatus which has advantages such as high image quality, small-size, light weight, low power consumption and low price.

What is claimed is:

1. A camera, comprising:

a first lens;

a second lens;

a photo-electric converting element to receive a light incoming from a subject image through said first lens and said second lens, and to convert said light into image signals;

a driving member to move said first lens and said second lens in an optical path;

guiding means for guiding said second lens moved by said driving member so that a distance between said photo-electric converting element and said second lens changes stepwise, wherein said driving member selectively moves said second lens to one of a plurality of predetermined positions of said guiding means during a focal length changing operation;

ranging means for measuring a distance between said camera and a subject to output a ranging signal;

a first image processor to output a first image data generated by processing said image signals which are converted from said subject image, said subject image being received by said photo-electric converting element when said second lens is located at a first position of said plurality of predetermined positions; and a second image processor to output a second image data generated by processing said first image data on the basis of said ranging signal.

2. The camera of claim 1, wherein both said focal length changing operation and a focus adjustment are performed by means of said driving member.

3. The camera of claim 2, wherein said focal length changing operation is zooming operation, and said focus adjustment is a focusing operation.

4. The camera of claim 1, wherein said guiding means has a cam groove.

5. The camera of claim 1, further comprising:

a display for displaying images based on said image signals.

6. The camera of claim 1, wherein said guiding means comprises:

first guiding means for conducting said focal length changing operation by guiding said second lens in said optical path so as to trace a first predetermined locus in relative to said first lens; and second guiding means for conducting a focus adjustment by guiding said second lens in said optical path so as to trace a second predetermined locus, which is different from said first predetermined locus, in relative to said first lens, wherein said second guiding means are located on an extension of said first guiding means in such a manner that said first guiding means and said second guiding means are staggered on said guiding means.

7. The camera of claim 1, wherein said driving member moves said second lens on said guiding means during both said focal length changing operation and a focus adjustment.

8. The camera of claim 1, wherein said driving member is a single member to drive both said first lens and said second lens.

9. The camera of claim 1, wherein said driving member is a cam barrel in which cam grooves are formed stepwise on inner surface of said cam barrel.

10. The camera of claim 1, wherein said second image processor applies a magnification change processing to said first image data.

11. The camera of claim 10, further comprising:

memory means for memorizing a plurality of image magnification factors which correspond to said plurality of predetermined positions and said ranging signals, wherein said second image processor selects an image magnification factor, corresponding to said ranging signal and information designating said first position, out of a plurality of said image magnification factors memorized in said memory means, and then, said second image processor applies a magnification change processing to said first image data on the basis of said image magnification factor selected by said second image processor.

12. The camera of claim 1, further comprising:

a calculator to calculate an image magnification factor, which varies between before and after said focus adjustment, on the basis of said ranging signal and information designating said first position, wherein said second image processor applies a magnification change processing to said first data on the basis of said image magnification factor.

13. The camera of claim 1, further comprising:

an image display for displaying an image based on said image signals converted by said photo-electric converting element, wherein said focus adjustment and an image capturing are performed after said image display displays images based on said second image data.

14. The camera of claim 1,
wherein said second image processor performs a processing for extracting at least a part of said first image data to generate said second image data.

15. The camera of claim 14, further comprising:
a calculator to calculate an image magnification factor, which varies between before and after said focus adjustment, on the basis of said ranging signal and information designating said first position, wherein said second image processor applies a grouping processing to a peripheral region of said first image data on the basis of said image magnification factor to generate said second image data.

16. The camera of claim 15,
wherein said grouping processing performed by said second image processor is to superpose a predetermined window frame on a peripheral region of an image based on said first image data.

17. The camera of claim 15,
wherein said grouping processing performed by said image processor is to superpose a predetermined color region and/or pattern region on a peripheral region of an image based on said first image data.

18. The camera of claim 14,
wherein said driving member moves said second lens from one of said plurality of predetermined positions on said guiding means in such a direction that an image frame reduces, during said focus adjustment.

19. The camera of claim 14,
wherein a position of a maximum image frame in each of predetermined variable power regions is located at each of said plurality of predetermined postions.

20. The camera of claim 1,
wherein said driving member moves said second lens from one of said plurality of predetermined positions on said guiding means in such a direction that an image frame reduces, during said focus adjustment.

21. The camera of claim 1,
wherein a position of a maximum image frame in each of predetermined variable power regions is located at each of said plurality of predetermined positions.

22. The camera of claim 1,
wherein said driving member is capable of moving said second lens to a storing region located at a position nearer said photo-electric converting element than a position of the shortest focal length, and image capturing is not performed when said second lens is located at said storing region.

23. The camera of claim 1, further comprising:
a display for appropriately displaying images based on said first image data, said second image data and a third image data which is outputted by said first image processor after said focus adjustment.

24. The camera of claim 23, further comprising:
a memory for memorizing said third image data.

25. The camera of claim 1, further comprising:
an exposure section to expose a silver-halide film, wherein said light incoming from a subject image through said first lens and said second lens is divided into a first light and a second light, said first light is introduced to said photo-electric converting element while said second light is introduced to said exposure section.

26. The camera of claim 1, wherein said guiding means guides said second lens moved by said driving member so that a distance between a focal surface of said photo-electric converting element and said second lens changes stepwise.

27. A camera, comprising:
a first lens;
a second lens;
a photo-electric converting element to receive a light incoming from a subject image through said first lens and said second lens, and to convert said light into image signals;
a driving member to move said first lens and said second lens in an optical path;
guiding means for guiding said second lens moved by said driving member so that a distance between said photo-electric converting element and said second lens changes stepwise, wherein said driving member selectively moves said second lens to one of a plurality of predetermined positions of said guiding means during a focal length changing operation;
a discriminator for discriminating whether said second lens is moved to a first region of said guiding means or is moved to a second region of said guiding means by said driving member; and
an image processing section to output a first image data based on said image signals if said discriminator determines that said second lens is moved to said first region, and to output a second image data generated by applying a magnification change processing to said image signals based on a predetermined zooming magnification factor if said discriminator determines that said second lens is moved to said second region.

28. The camera of claim 27, further comprising:
a memory for memorizing said zooming magnification factors, wherein said memory memorizes a plurality of zooming magnification factors which correspond to positions to which said second lens is moved.

29. The camera of claim 27, further comprising:
a display for displaying images based on said image signals, wherein said display displays images based on said first image data or said second image data during focal length changing operation.

30. The camera of claim 27,
wherein an image processing is not performed in said first region, while an image processing is performed in said second region.

31. The camera of claim 27,
wherein said discriminator discriminates whether said second lens is moved to a first region of said guiding means or is moved to a second region of said guiding means by said driving member during a focal length changing operation, and said image processing section outputs either said first image data or said second image data, based on said image signals obtained after focus adjustment.

32. The camera of claim 27, further comprising:
ranging means for measuring a distance between said camera and said subject to output a ranging signal, wherein said image processing section outputs said first image data based on said image signals, which are obtained after performing a focus adjustment on the basis of said ranging signal from a predetermined reference position, when said discriminator determines that said second lens is moved to said first region, and outputs a second image data generated by applying a magnification change processing to said image signals, which are obtained after performing a focus adjustment on the basis of said ranging signal form a predetermined reference position, based on predetermined zooming magnification factors, when said discriminator determines that said second lens is moved to said second region.

33. A camera, comprising:

a first lens;

a second lens;

a photo-electric converting element to receive a light incoming from a subject image through said first lens and said second lens, and to convert said light into image signals;

a driving member to move said first lens and said second lens in an optical path;

guiding means for guiding said second lens moved by said driving member so that a distance between said photo-electric converting element and said second lens changes stepwise, wherein said driving member selectively moves said second lens to one of a plurality of predetermined positions of said guiding means during a focal length changing operation;

a discriminator for discriminating whether said second lens is moved to a first region of said guiding means or is moved to a second region of said guiding means by said driving member; and an image processing section to output a first image data based on said image signals before focus adjustment if said discriminator determines that said second lens is moved to said first region, and to output a second image data generated by applying a magnification change processing to said image signals based on a predetermined zooming magnification factor before focus adjustment if said discriminator determines that said second lens is moved to said second region.

34. The camera of claim 33, further comprising:

a memory for memorizing said zooming magnification factor, wherein said memory means memorizes a plurality of zooming magnification factors which correspond to positions to which said second lens is moved.

35. The camera of claim 33, further comprising:

a display for displaying images based on said image signals, wherein said display displays images based on said first image data or said second image data before a focal length changing operation.

36. The camera of claim 33, further comprising:

ranging means for measuring a distance between said camera and said subject to output a ranging signal, wherein said image processing section outputs said first image data based on said image signals, which are obtained after performing a focus adjustment on the basis of said ranging signal from a predetermined reference position, when said discriminator determines that said second lens is moved to said first region, or to output a second image data generated by applying a magnification change processing to said image signals, which are obtained after performing a focus adjustment on the basis of said ranging signal from a predetermined reference position, based on predetermined zooming magnification factors, when said discriminator determines that said second lens is moved to said second region.

37. An image capturing apparatus being characterized in that said image capturing apparatus is provided with:

a zoom lens in which a variable power operation in a plurality of predetermined variable power regions and a focus adjustment in each of said variable power regions are performed by means of a driving action of single component driving member;

ranging means for measuring a distance between said image capturing apparatus and a subject;

a calculator to calculate an image magnification factor, which varies between before and after said focus adjustment, from a ranging signal of said ranging means and a variable power information designating a selected variable power region of said zoom lens;

a photo-electric converting element to receive a subject image by means of said zoom lens, and to convert said subject image into image signals;

a first image processor for outputting a first image data generated by processing said image signals before said focus adjustment; and a second image processor for outputting a second image data generated by applying a magnification change processing to said first image data based on a calculation result of said calculator.

38. An image capturing apparatus being characterized in that said image capturing apparatus is provided with:

a zoom lens in which a variable power operation in a plurality of predetermined variable power regions and a focus adjustment in each of said variable power regions are performed by means of a driving action of single component driving member;

ranging means for measuring a distance between said image capturing apparatus and a subject;

a calculator to calculate an image magnification factor, which varies between before and after said focus adjustment, from a ranging signal of said ranging means and a variable power information designating a selected variable power region of said zoom lens;

a photo-electric converting element to receive a subject image by means of said zoom lens, and to convert said subject image into image signals;

a first image processor for outputting a first image data generated by processing said image signals before said focus adjustment; and a second image processor for outputting a second image data generated by applying a grouping processing to a peripheral region of said first image data based on a calculation result of said calculator.

39. An image capturing apparatus being characterized in that said image capturing apparatus is provided with:

a zoom lens in which both a zooming operation and a focusing operation are performed by means of a driving action of single component driving member, and which is driven to either a first region in which a image processing is not performed, or a second region in which a image processing is performed;

a discriminator for discriminating whether said zoom lens is moved to said first region or is moved to said second region;

a photo-electric converting element to receive a subject image incoming through said zoom lens, and to convert said subject image into image signals; and an image processing section to output a first image data based on said image signals when said discriminator determines that said zoom lens is moved to said first region, or to output a second image data generated by applying a magnification change processing to said image signals based on predetermined zooming magnification factor when said discriminator determines that said zoom lens is moved to said second region.

40. An image capturing apparatus being characterized in that said image capturing apparatus is provided with:

a zoom lens in which both a zooming operation and a focusing operation are performed by means of a driving action of single component driving member, and which is driven to either a first region in which a image processing is not performed during said focusing operation, or a second region in which a image processing is performed during said focusing operation;

a discriminator for discriminating whether said zoom lens is moved to said first region or is moved to said second region;

a photo-electric converting element to receive a subject image incoming through said zoom lens, and to convert said subject image into image signals; and an image processing section to output a first image data based on said image signals when said discriminator determines that said zoom lens is moved to said first region, or to output a second image data generated by applying a magnification change processing to said image signals based on predetermined zooming magnification factor when said discriminator determines that said zoom lens is moved to said second region.

41. A camera, comprising:

a first lens;

a second lens;

a photo-electric converting element to receive a light coming from a subject through said first lens and said second lens, and to convert said light into image signals;

a driving member to move said first lens and said second lens in an optical path;

a guiding member to guide said second lens moved by said driving member so that a distance between said photo-electric converting element and said second lens changes step by step corresponding to a plurality of predetermined positions of said guiding means;

a discriminator to discriminate a position of said second lens guided by said guiding member; and an image processing section to apply an image processing, corresponding to a discrimination result outputted from said discriminator, to said image signals generated by said photo-electric converting element, wherein said image processing section outputs said image signals, generated by said photo-electric converting element, without applying said image-processing when said discriminator determines that said second lens is located at a first position, while said image processing section outputs processed image signals, acquired by applying said image processing, when said discriminator determines that said second lens is located at a second position.

42. The camera of claim 41, wherein both a focal length changing operation and a focus adjustment are performed by means of said driving member.

43. The camera of claim 41, wherein said driving member selectively moves said second lens to one of said plurality of predetermined positions of said guiding member during a focal length changing operation.

44. The camera of claim 43, wherein said guiding member has a cam groove.

45. The camera of claim 41, further comprising:

a display for displaying an image based on said image signals.

46. The camera of claim 41, wherein said image processing is an image-enlargement processing.

47. The camera of claim 41, wherein said first position is a reference position in each of zooming regions, while said second position is a predetermined focal position in each of said zooming regions.

* * * * *